(12) United States Patent
Jeong et al.

(10) Patent No.: US 12,100,070 B1
(45) Date of Patent: Sep. 24, 2024

(54) METHOD AND APPARATUS FOR IMPLEMENTING VIRTUAL SMOKE

(71) Applicant: KT&G CORPORATION, Daejeon (KR)

(72) Inventors: Minseok Jeong, Daejeon (KR); Jae Hyun Kim, Daejeon (KR); Tae Young Chung, Daejeon (KR)

(73) Assignee: KT&G CORPORATION, Daejeon (KR)

( * ) Notice: Subject to any disclaimer, the term of this patent is extended or adjusted under 35 U.S.C. 154(b) by 0 days.

(21) Appl. No.: 18/271,096

(22) PCT Filed: Mar. 21, 2023

(86) PCT No.: PCT/KR2023/003686
§ 371 (c)(1),
(2) Date: Jul. 6, 2023

(87) PCT Pub. No.: WO2023/229180
PCT Pub. Date: Nov. 30, 2023

(30) Foreign Application Priority Data

May 27, 2022 (KR) .......................... 10-2022-0065527

(51) Int. Cl.
*G06F 3/01* (2006.01)
*G06T 7/70* (2017.01)
*G06T 11/00* (2006.01)

(52) U.S. Cl.
CPC .............. *G06T 11/00* (2013.01); *G06F 3/011* (2013.01); *G06T 7/70* (2017.01)

(58) Field of Classification Search
None
See application file for complete search history.

(56) References Cited

U.S. PATENT DOCUMENTS

| | | |
|---|---|---|
| 2017/0196260 A1* | 7/2017 | Kobal ..................... G06T 19/20 |
| 2019/0000147 A1 | 1/2019 | Koc et al. |
| 2019/0295304 A1 | 9/2019 | Janardhan et al. |

FOREIGN PATENT DOCUMENTS

| | | |
|---|---|---|
| CN | 110662176 A | 1/2020 |
| EP | 4 230 069 A1 | 8/2023 |
| KR | 10-2008-0014742 A | 2/2008 |
| KR | 10-2010-0115679 A | 10/2010 |
| KR | 10-2021-0042754 A | 4/2021 |
| WO | 2021/260343 A1 | 12/2021 |

OTHER PUBLICATIONS

International Search Report for PCT/KR2023/003686 dated Jun. 27, 2023.
Extended European Search Report issued May 28, 2024 in Application No. 23732799.4.

* cited by examiner

Primary Examiner — Carl Adams
(74) Attorney, Agent, or Firm — Sughrue Mion, PLLC

(57) ABSTRACT

The following embodiments relate to a method of controlling an electronic device to implement virtual smoke in a virtual display device. The method of controlling an electronic device includes predicting a virtual smoke implementation timepoint by monitoring the distance between one side of the electronic device and an object, and transmitting a control signal including the virtual smoke implementation timepoint to a device for displaying a virtual image.

10 Claims, 13 Drawing Sheets

METHOD AND APPARATUS FOR IMPLEMENTING VIRTUAL SMOKE

CROSS REFERENCE TO RELATED APPLICATIONS

This application is a National Stage of International Application No. PCT/KR2023/003686 filed Mar. 21, 2023, claiming priority based on Korean Patent Application No. 10-2022-0065527 filed May 27, 2022.

TECHNICAL FIELD

The following embodiments relate to a method of controlling an electronic device to implement virtual smoke in a virtual display device.

BACKGROUND ART

Recently, virtual reality (VR), augmented reality (AR), and mixed reality (MR) technologies utilizing computer graphics technology have been developed. At this time, VR technology refers to a technology that uses a computer to build a virtual space that does not exist in the real world and then makes a user feel the virtual space like reality, and AR or MR technology refers to a technology that adds computer-generated information to the real world, that is, a technology that combines the real world and a virtual world to allow real-time interaction with a user.

Among these technologies, AR and MR technologies are utilized in conjunction with technologies in various fields. Even in the field of electronic cigarettes, demand for devices that implement VR or AR services is increasing, and a variety of research is being conducted accordingly.

DISCLOSURE OF THE INVENTION

Technical Goals

Embodiments are provided to predict a virtual smoke implementation timepoint by sensing a change in the distance between an electronic device and a user.

Embodiments are provided to implement virtual smoke even in virtual reality (VR) at a timepoint at which a user exhales by transmitting a control signal including a predicted virtual smoke implementation timepoint to a VR device, thereby implementing virtual smoke without a sense of difference.

The technical goals to be achieved by the present invention are not limited to those described above, and other technical goals not mentioned above can be clearly understood from the following description and accompanying drawings by one having ordinary skill in the technical field to which the present invention pertains.

Technical Solutions

According to an embodiment, a method of controlling an electronic device includes predicting a virtual smoke implementation timepoint by monitoring a distance between one side of the electronic device and an object: and transmitting a control signal including the virtual smoke implementation timepoint to a device for displaying a virtual image.

The predicting of the virtual smoke implementation timepoint may include detecting a first timepoint at which the distance between the one side of the electronic device and the object reaches within a first threshold value: and detecting a second timepoint at which the distance between the one side of the electronic device and the object exceeds a second threshold value, after the first timepoint.

The predicting of the virtual smoke implementation timepoint may include predicting the virtual smoke implementation timepoint based on an interval between the first timepoint and the second timepoint.

The predicting of the virtual smoke implementation timepoint may include predicting a first respiration time based on the interval between the first timepoint and the second timepoint: predicting a timepoint of second respiration based on the interval between the first timepoint and the second timepoint and the first respiration time: and determining the timepoint of second respiration to be the virtual smoke implementation timepoint.

The predicting of the virtual smoke implementation timepoint may include estimating an intake volume and a respiration volume of a user based on the interval between the first timepoint and the second timepoint, wherein the intake volume may include an intake volume of an aerosol that is inhaled by the user through the electronic device in a state in which the electronic device and the object are in contact, and the respiration volume may include an inspiration volume inhaled by the user in a state in which the electronic device and the object are not in contact.

The predicting of the virtual smoke implementation timepoint may include predicting the virtual smoke implementation timepoint based on the intake volume and the respiration volume.

The predicting of the virtual smoke implementation timepoint may include determining whether the electronic device satisfies a predetermined operating condition: and predicting the virtual smoke implementation timepoint based on a determination that the electronic device satisfies the operating condition.

The operating condition may include at least one of whether the electronic device is powered on/off and whether a suction sensor included in the electronic device operates.

The transmitting of the control signal to the device for displaying a virtual image may include transmitting information about a type of virtual smoke: and transmitting information about a delay in communication between the electronic device and the device for displaying a virtual image.

A computer program stored in a computer-readable storage medium to execute the method described above in combination with hardware.

According to an embodiment, an electronic device includes a distance detection sensor configured to monitor a distance between one side of the electronic device and an object, and a processor configured to predict a virtual smoke implementation timepoint based on a result of the monitoring and transmit a control signal including the virtual smoke implementation timepoint to a device for displaying a virtual image.

The processor may be configured to predict the virtual smoke implementation timepoint by detecting a first timepoint at which the distance between the one side of the electronic device and the object reaches within a first threshold value, and detecting a second timepoint at which the distance between the one side of the electronic device and the object exceeds a second threshold value, after the first timepoint.

The processor may be configured to predict the virtual smoke implementation timepoint based on an interval between the first timepoint and the second timepoint.

The processor may be configured to predict a first respiration time based on the interval between the first timepoint and the second timepoint, predict a timepoint of second respiration based on the interval between the first timepoint and the second timepoint and the first respiration time, and determine the timepoint of second respiration to be the virtual smoke implementation timepoint.

The processor may be configured to predict the virtual smoke implementation timepoint by estimating an intake volume and a respiration volume of a user based on the interval between the first timepoint and the second timepoint, wherein the intake volume may include an intake volume of an aerosol that is inhaled by the user through the electronic device in a state in which the electronic device and the object are in contact, and the respiration volume may include an inspiration volume inhaled by the user in a state in which the electronic device and the object are not in contact.

The processor may be configured to predict the virtual smoke implementation timepoint based on the intake volume and the respiration volume.

The processor may be configured to determine whether the electronic device satisfies a predetermined operating condition, and predict the virtual smoke implementation timepoint based on a determination that the electronic device satisfies the operating condition.

The operating condition may include at least one of whether the electronic device is powered on/off and whether a suction sensor included in the electronic device operates. The control signal may include a control signal for transmitting information about a type of virtual smoke and information about a delay in communication between the electronic device and the device for displaying a virtual image.

Effects

Embodiments may predict a virtual smoke implementation timepoint by sensing a change in the distance between an electronic device and a user.

Embodiments may implement virtual smoke even in virtual reality (VR) at a timepoint at which a user blows an aerosol out in practice by transmitting a control signal including a predicted virtual smoke implementation timepoint to a VR device, thereby implementing virtual smoke without a sense of difference.

The effects of the present invention are not limited to those described above, and other effects not mentioned above can be clearly understood from the following description and accompanying drawings by one having ordinary skill in the technical field to which the present invention pertains.

BEST MODE FOR CARRYING OUT THE INVENTION

Figure 1:
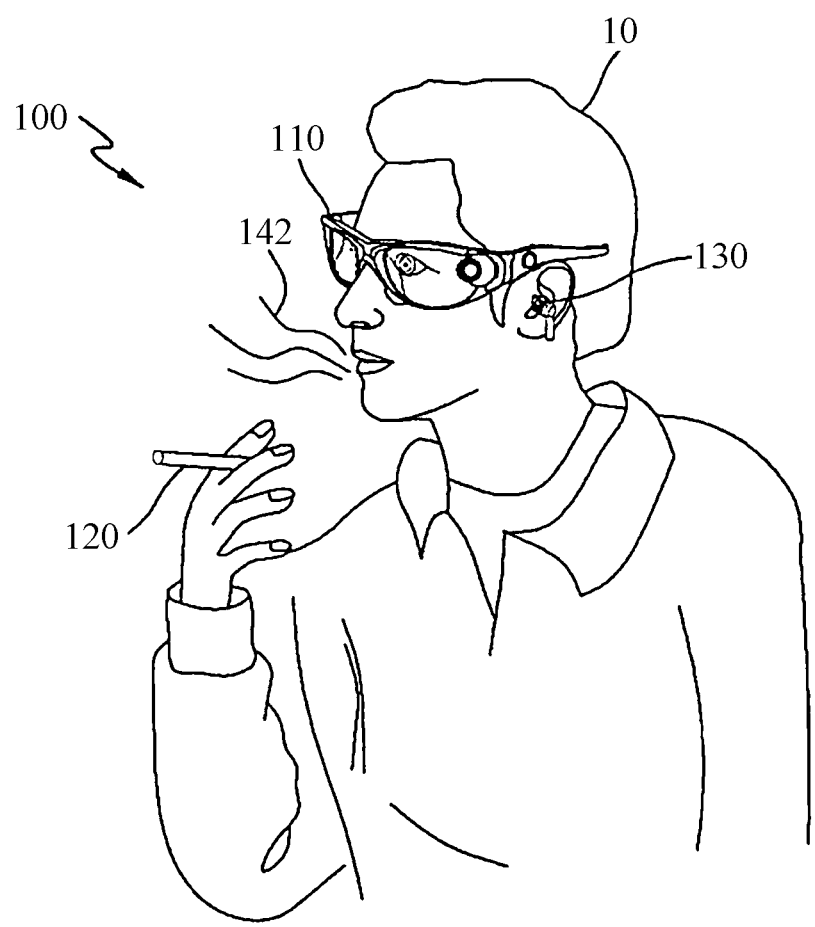
FIG. 1 is a diagram illustrating a virtual smoking system.

The following detailed structural or functional description is provided as an example only and various alterations and modifications may be made to the embodiments. Here, the embodiments are not construed as limited to the disclosure and should be understood to include all changes, equivalents, and replacements within the idea and the technical scope of the disclosure.

Terms, such as first, second, and the like, may be used herein to describe components. Each of these terminologies is not used to define an essence, order or sequence of a corresponding component but used merely to distinguish the corresponding component from other component(s). For example, a first component may be referred to as a second component, and similarly, the second component may also be referred to as the first component.

It should be noted that if it is described that one component is "connected", "coupled", or "joined" to another component, a third component may be "connected", "coupled", and "joined" between the first and second components, although the first component may be directly connected, coupled, or joined to the second component.

The singular forms "a", "an", and "the" are intended to include the plural forms as well, unless the context clearly indicates otherwise. It will be further understood that the terms "comprises/comprising" and/or "includes/including" when used herein, specify the presence of stated features, integers, steps, operations, elements, and/or components, but do not preclude the presence or addition of one or more other features, integers, steps, operations, elements, components and/or populations thereof.

Unless otherwise defined, all terms, including technical and scientific terms, used herein have the same meaning as commonly understood by those having ordinary skill in the art to which this disclosure pertains. Terms, such as those defined in commonly used dictionaries, are to be interpreted as having a meaning that is consistent with their meaning in the context of the relevant art, and are not to be interpreted in an idealized or overly formal sense unless expressly so defined herein.

Hereinafter, embodiments will be described in detail with reference to the accompanying drawings. When describing the embodiments with reference to the accompanying drawings, like reference numerals refer to like elements and a repeated description related thereto will be omitted.

FIG. 1 is a diagram illustrating a virtual smoking system according to an embodiment.

Referring to FIG. 1, a virtual smoking system 100 may include a device 110 for displaying a virtual image (hereinafter, referred to as the display device) and an electronic device 120. A user 10 using the virtual smoking system 100 may wear the display device 110 and smoke through the electronic device 120. "Smoking" may indicate heating, burning, and other actions intended to cause the release of smoke or aerosol from a substance that can be smoked. The display device 110 according to an embodiment may implement virtual smoke in response to a smoking action of the user 10 through the electronic device 120.

More specifically, in an embodiment, the electronic device 120 may be referred to as an aerosol generating device, an electronic cigarette device, or a smoking stick. The structure and specific operating method of the electronic device 120 will be described in detail below with reference to FIG. 4.

According to an embodiment, the user may perform a smoking action using the electronic device 120, and smoke 142 may be generated from the breath of the user accordingly. The electronic device 120 according to an embodiment may provide an aerosol to user 10 by heating an aerosol generating article within the electronic device 120 in various manners. For example, the aerosol generating article may be a stick that is inserted into the electronic device 120. As another example, the aerosol generating article may be a replaceable cartridge that is inserted into the electronic device 120.

According to an embodiment, the smoke 142 may be generated from the breath of the user who inhales the aerosol provided by the electronic device 120, but is not limited thereto. According to another embodiment, the electronic device 120 may measure only the smoking action of the user through the electronic device 120, and in this case, smoke 142 may not be generated from the breath of the user, but is not limited thereto.

According to an embodiment, the display device 110 may independently provide a virtual reality (VR) service or an augmented reality (AR) service, or may provide a VR service or an AR service in interoperation with a third electronic device (e.g., a smartphone) connected to the electronic device 120 or the display device 110 by a wire or wirelessly. The structure and specific operating method of the display device 110 will be described in detail below with reference to FIG. 3.

VR or AR is considered a visual simulation that generates a virtual or augmented visual environment. As used herein, the term "VR" includes simulated images that are generated for visualization for smokers and include partially or completely simulated environments. Also, as used herein, the term "AR" is considered as including a combination of simulated images used to augment a real or "live" environment, wherein a live image is used in combination with a simulated image overlaid on the live image. As a result of VR or AR, to form an interactive environment that can be seen or felt realistic, a simulated virtual image may be provided, or a live visual image may be augmented with a simulated augmented image. Hereinafter, for ease of description, a space in which VR or AR is provided is referred to as a virtual space.

According to an embodiment, the display device 110 may be worn on a predetermined part (e.g., the head) of a user to provide an image to the user. For example, the display device 110 may be configured in the form of at least one of glasses, goggles, a helmet, or a hat, but is not limited thereto.

According to an embodiment, the electronic device 120 and the display device 110 may be connected to each other through at least one wireless communication of short-range communication or cellular communication. As an example, short-range communication may include at least one of Bluetooth, Bluetooth Low Energy (BLE), or wireless LAN (e.g., Wi-Fi Direct). As an example, cellular communication may include at least one of long-term evolution (LTE), LTE Advance (LTE-A), fifth generation (5G) (or new radio (NR)), code-division multiple access (CDMA), wideband CDMA (WCDMA), or global system for mobile communication (GSM). Alternatively, the electronic device 120 and the display device 110 may be connected to each other by a wire based on a universal serial bus (USB) manner.

The virtual smoking system 100 according to an embodiment may further include a reproduction device 130. For example, the reproduction device 130 may be a device for providing sound to a user, and a method of providing sound is not limited. With the interoperation between the display device 110, the article 120, and the reproduction device 130 included in the virtual smoking system 100, a more improved smoking experience may be provided to the user 10 who uses the virtual smoking system 100. Although FIG. 1 illustrates the display device 110 and the reproduction device 130 separately, the display device 110 may include the reproduction device 130 according to embodiments.

The display device 110 according to an embodiment may include one or more auxiliary devices. For example, the display device 110 may include a brainwave measurement module, a surface electromyogram (EMG) sensor, and the like to increase the sense of reality of a smoking action in a virtual space.

Figure 2A:
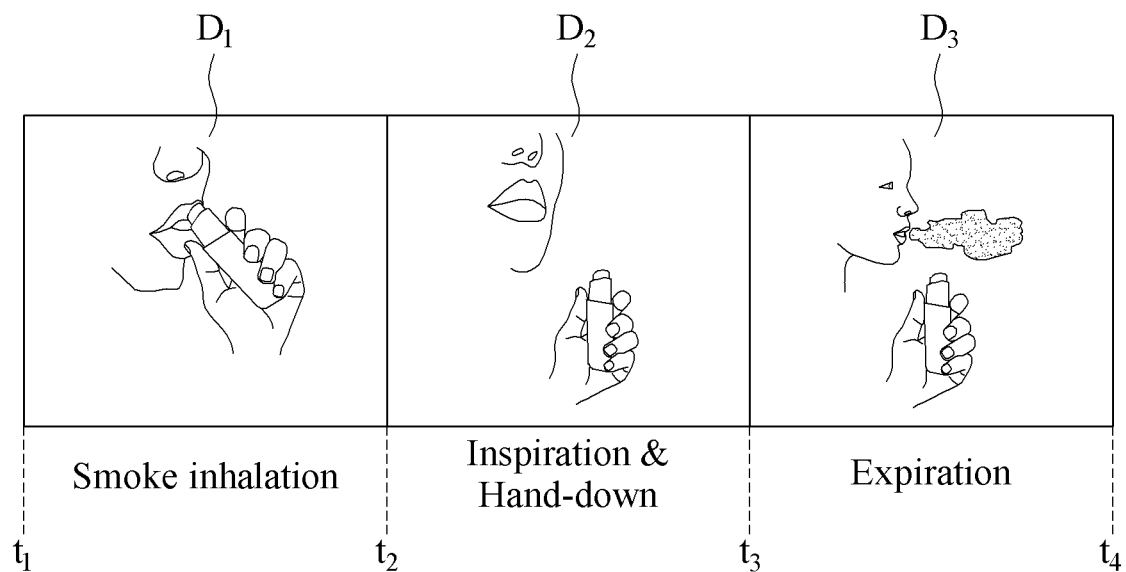
FIG. 2A illustrates a smoking action of a user divided into intervals according to an embodiment.

FIG. 2A illustrates a smoking action of a user divided into intervals according to an embodiment.

The description provided with reference to FIG. 1 may also apply to the description provided with reference to FIG. 2A, and any repeated description related thereto will be omitted.

According to an embodiment, a user may perform a smoking action through a process from a timepoint $t_1$ to a timepoint $t_4$.

More specifically, referring to FIG. 2A, according to an embodiment, the user may inhale a substance that can be smoked (e.g., an aerosol) through the electronic device 120, in an interval D1 between the timepoint $t_1$ and the timepoint $t_2$. The electronic device 120 may generate an aerosol in various manners. Hereinafter, a motion of the user in the interval D1 may be referred to as a "smoke inhalation" motion, and the user may suck the substance that can be smoked into the mouth with the electronic device 120 in the mouth through the smoke inhalation motion. In the interval $D_1$, the user and one side (e.g., an intake or a mouthpiece) of the electronic device 120 may be in contact with each other.

According to an embodiment, the user may inhale the smoke collected in the mouth through inspiration, in the interval $D_2$ between the timepoint $t_2$ and the timepoint $t_3$. Hereinafter, the motion of the user in the interval $D_2$ may be referred to as an "inspiration" motion (or "inspiration and hand-down" motion), and the user may take the one side of the electronic device 120 away from the lips and lower the hand while performing inspiration. In the interval $D_2$, the user and the electronic device 120 may be separated.

According to an embodiment, the user may exhale the inhaled smoke through expiration, in the interval D; between the timepoint $t_3$ and the timepoint $t_4$. Hereinafter, the motion of the user in the interval $D_3$ may be referred to as an "expiration" motion.

According to an embodiment, the length of the interval $D_2$ (the inspiration time) may be estimated based on the length of the interval $D_1$ (the smoke inhalation time). As an example, the length of the interval $D_2$ (the inspiration time) may be proportional to the length of the interval $D_1$ (the smoke inhalation time). For example, if the smoke inhalation time is "1" second, the inspiration time may be "1" second, and if the smoke inhalation time is "3" seconds, the inspiration time may also be "3" seconds. Alternatively; an inspiration time corresponding to a smoke inhalation time may be predicted using an artificial neural network. For example, an inspiration time corresponding to a smoke inhalation time may be predicted by inputting the smoke inhalation time into an artificial neural network trained based on pair training data of smoke inhalation times and inspiration times. However, the method of estimating the inspiration time based on the smoke inhalation time is not limited to the above example.

If it is possible to predict the length of the interval $D_2$ (the inspiration time), then it means that it is possible to predict $t_3$ (the expiration timepoint). That is, the length of the interval $D_2$ may be predicted by measuring the length of the interval $D_1$ (the smoke inhalation time), and $t_3$ (the expiration timepoint) may be predicted by adding the predicted length of the interval $D_2$ to the measured length of the interval $D_1$.

According to an embodiment, the length of the interval $D_3$ (the expiration time) may be determined based on at least one of the length of the interval $D_1$ (the smoke inhalation time) and the length of the interval $D_2$ (the inspiration time). For example, the length of the interval $D_3$ may be determined to be in proportion to the length of the interval $D_1$ or the length of the interval $D_2$. The timepoint $t_4$ may be predicted based on the predicted $t_3$ (the expiration timepoint) and the length of the interval $D_3$.

According to an embodiment, the user may set information about the length of the interval $D_3$ in the electronic device 120 in advance. For example, the ratio thereof to the length of the interval $D_1$ or the length of the interval $D_2$ may be set by the user. When the user wants to maintain the output time of virtual smoke to be relatively long, the user may set the ratio to be large.

Figure 2B:
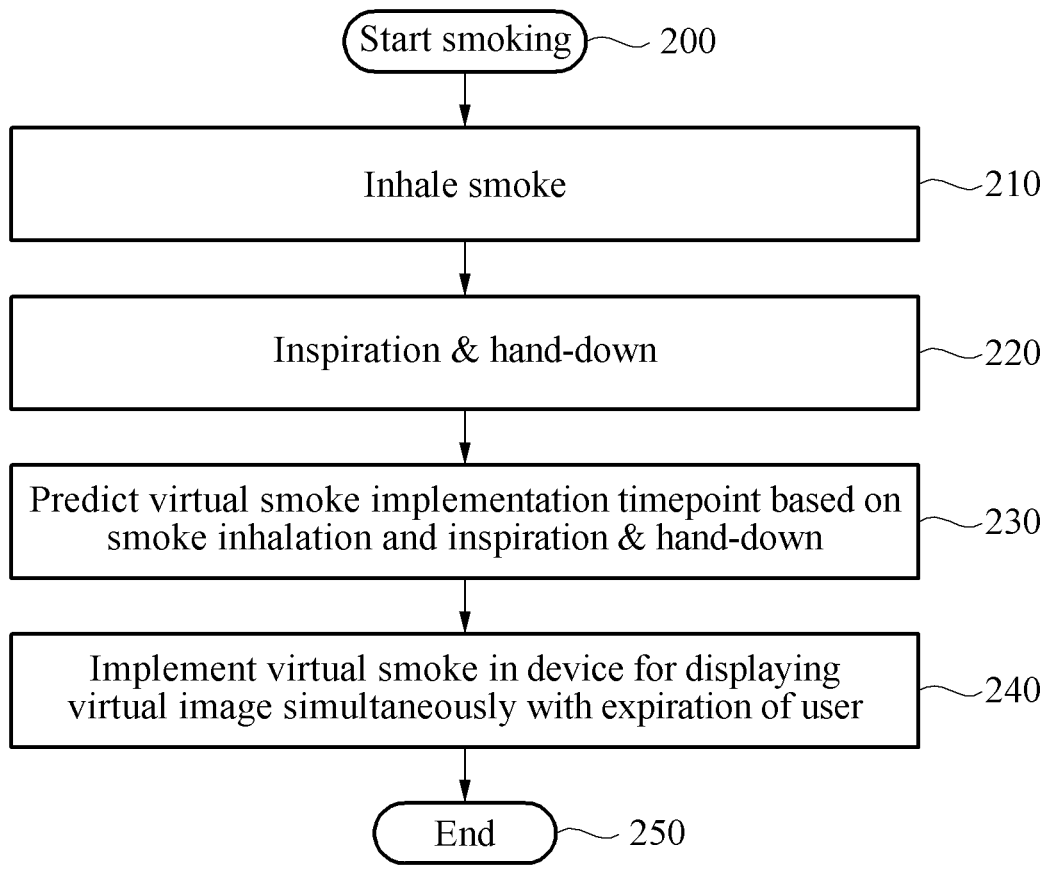
FIG. 2B is a block diagram illustrating the prediction of a virtual smoke implementation timepoint for a smoking action of a user in a virtual space and the implementation of virtual smoke.

FIG. 2B is a diagram illustrating a method of predicting a virtual smoke implementation timepoint for a smoking action of a user in a virtual space and implementing virtual smoke.

The description provided with reference to FIGS. 1 and 2A may also apply to the description provided with reference to FIG. 2B, and any repeated description related thereto will be omitted.

In a virtual smoking system according to an embodiment, a user may experience VR or AR of smoking by linking smoking in the real world through the electronic device 120 with the display device 110. More specifically, the display device 110 according to an embodiment may implement virtual smoke in a virtual space at the timepoint when the user actually exhales real smoke through the electronic device 120, thereby implementing virtual smoke without a sense of difference.

The user of the electronic device 120 according to an embodiment may perform a smoking action by repeating the motions of $D_1$ to $D_3$ of FIG. 2A at least one or more times, and the display device 110 or the electronic device 120 may implement virtual smoke by sensing or predicting the cigarette smoke inhalation, inspiration, and expiration of the user. Hereinafter, "implementing virtual smoke" may include determining at least one of the implementation timepoint, duration, and appearance (e.g., shape or color) of the virtual smoke.

Referring to FIG. 2B, according to an embodiment, when a user starts smoking in operation 200, the user may inhale a substance that can be smoked into the mouth through the electronic device 120. At this time, the time for which the user inhales cigarette smoke (e.g., $D_1$ in FIG. 2A) may be measured in operation 210. Thereafter, when the user finishes smoke inhalation, the user may perform an inspiration and hand-down motion. At this time, the time for which the user performs the inspiration and hand-down motion (e.g., $D_2$ in FIG. 2A) may be measured in operation 220. The display device 110 or the electronic device 120 may predict the time for which the inspiration and hand-down motion is performed and the start timepoint of exhalation of the user (e.g., $t_3$ in FIG. 2A) based on the smoke inhalation time 210, in operation 230. When the user starts expiration, the display device 110 may implement virtual smoke during the time for which the user performs expiration (e.g., $D_3$ in FIG. 2A) in operation 240. When a predetermined time elapses after starting the expiration, the display device 110 may terminate the implementation of virtual smoke in operation 250.

Figure 3:
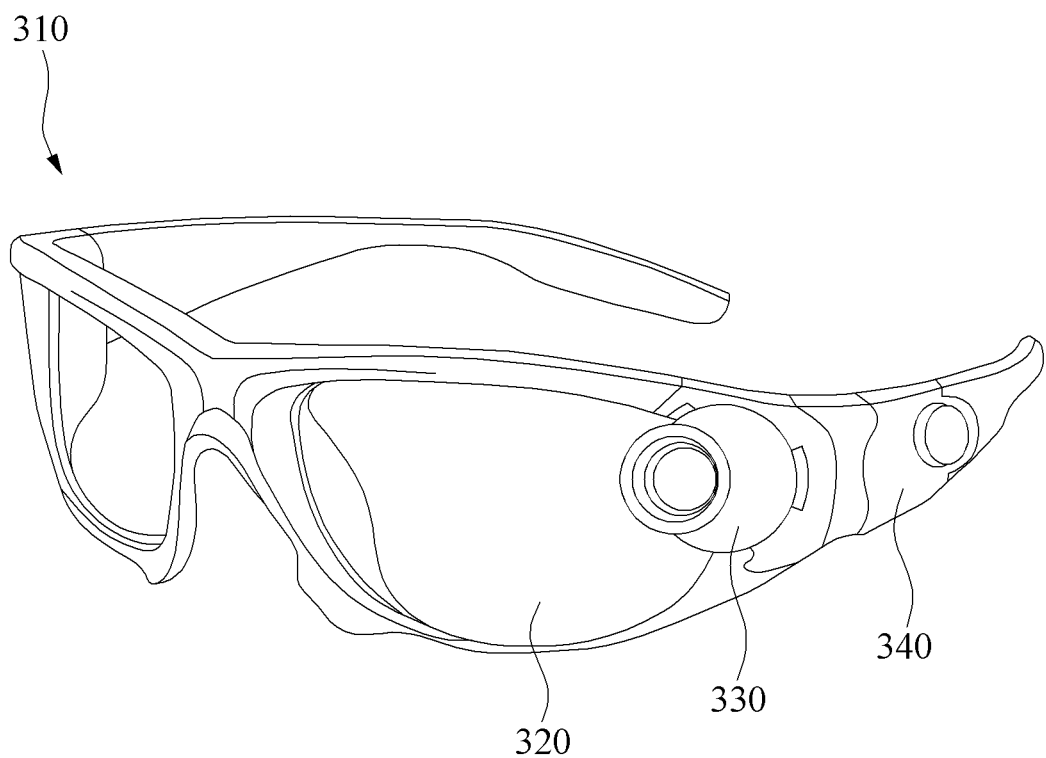
FIG. 3 schematically illustrates a device for displaying a virtual image.

FIG. 3 schematically illustrates a device for displaying a virtual image.

Referring to FIGS. 1 and 3 together, an XR device 310 is illustrated as an example of the display device 110 according to an embodiment. The XR device 310 may include a screen 320, a camera 330, and a temple portion 340. The XR device 310 may be one of devices for VR, AR, or metaverse, but the present embodiment is not limited thereto.

More specifically, when a user wears the XR device 310, the temple portion 340 of the XR device 310 may be seated on the ear of the user. However, the XR device 310 may include a band instead of the temple portion 340, and in this case, the band may be worn around the head of the user.

The XR device 310 may provide the user with a VR, AR, or metaverse image in which cigarette smoke is generated through the screen 320. In an embodiment, the screen 320 may be controlled to be transparent or opaque depending on the purpose of use. In the case where the XR device 310 provides a VR or metaverse image, the screen 320 may be controlled to be opaque, and in the case where the XR device 310 provides an AR image, the screen 320 may be controlled to be transparent.

For example, the screen 320 may include plastic such as polycarbonate or glass, but is not limited thereto. In addition, at least one coating method of anti-reflective and anti-glare coating, anti-fog, and ultraviolet (UV)-protective coating may be applied to the screen 320.

A virtual smoking system may include the XR device 310 and an article. The XR device 310 may receive content information of the article from the article. The XR device 310 may change an image to be displayed on the screen 320 based on the content information of the article.

In an embodiment, an image of cigarette smoke may be displayed on the screen 320, and the XR device 310 may change the image in relation to at least one of the color, amount, and shape of the cigarette smoke displayed on the screen 320 based on the content information of the article.

When the user uses the XR device 310, the camera 330 may scan a surrounding situation of reality to help the user with using the XR device 310. In addition, the camera 330 may monitor a motion of the user and transmit a control signal to the XR device 310.

Applications may be installed on the XR device 310 to provide various experiences to the user. For example, a virtual space smoking system may be provided by installing a smoking application to provide the user with a smoking experience close to reality. However, the present disclosure is not limited thereto.

The XR device 310 may include an electronic device to sense or predict a smoking action of the user in the virtual smoking system. For example, the XR device 310 may include a surface EMG sensor or a brainwave measurement module to sense a smoking motion of the user. The XR device 310 may include a communication device for communicating with the article. However, the present disclosure is not limited thereto.

Figure 4:
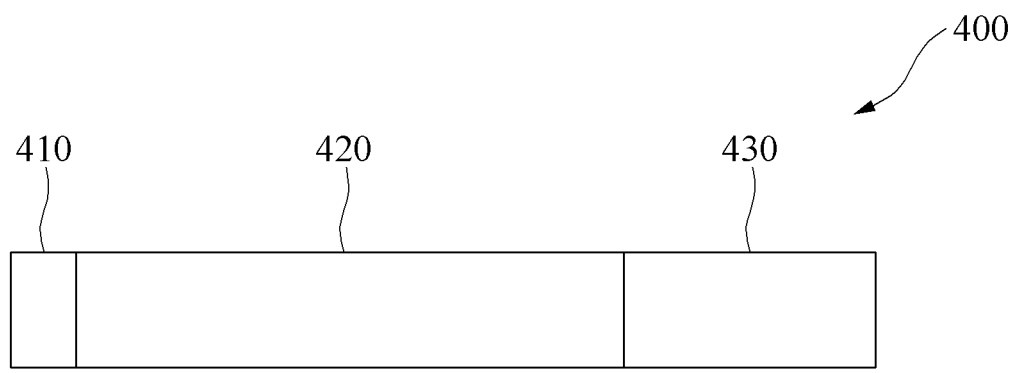
FIG. 4 illustrates an example of an electronic device according to an embodiment.

FIG. 4 illustrates an example of an electronic device according to an embodiment.

Referring to FIG. 4, an electronic device 400 may have a shape of a cigarette. The length and diameter of the electronic device 400 may be substantially the same as the length and diameter of a traditional tobacco cigarette. The electronic device 400 may be divided into a first end portion 410, a middle portion 420, and a second end portion 430. The electronic device 400 may be the electronic device 120 described above with reference to FIG. 1.

The first end portion 410 may be a portion for reproducing a burning portion of a cigarette. The first end portion 410 may include a light-emitting diode (LED). For example, the first end portion 410 may include a red LED.

The second end portion 430 may include nicotine. In an embodiment, the surface of the second end portion 430 may be coated with nicotine, or an aerosol generating article may be included in the second end portion 430. For example, when the aerosol generating article is heated, an aerosol including nicotine may be generated. When the user inhales the aerosol with the second end portion 430 of the electronic device 400 in the mouth, nicotine may be provided to the user. Meanwhile, the second end portion 430 may further include a fragrance portion including a fragrance, in addition to the aerosol generating article.

In an embodiment, the middle portion 420 may serve to connect the first end portion 410 and the second end portion 430. The total length of the electronic device 400 may be determined according to the length of the middle portion 420, and when manufacturing the electronic device 400, the length of the middle portion 420 may be set such that the length of the electronic device 400 may correspond to the length of a typical cigarette.

In another embodiment, the electronic device 400 may be an electronic device including other electronic equipment or electronic circuits therein (e.g., in the middle portion 420). For example, the electronic device 400 may include sensors for sensing a smoking action of the user. The sensors may include, for example, a sensor for detecting a change in distance, a sensor for detecting a change in coordinates, a sensor for detecting a change in capacitance, and a pressure sensor. The electronic device 400 may be an electronic device including other electronic equipment outside a housing thereof. For example, the electronic device 400 may include a camera for observing a smoking action of the user. The electronic device 400 may have a button inside or outside for a power control function, a smoking pattern learning function, or a smoking detection function. The electronic device 400 may be an electronic device including a communication device for communicating with the XR device 310. However, the present disclosure is not limited to an electronic device including sensors, a camera, or a button.

Figure 5A:
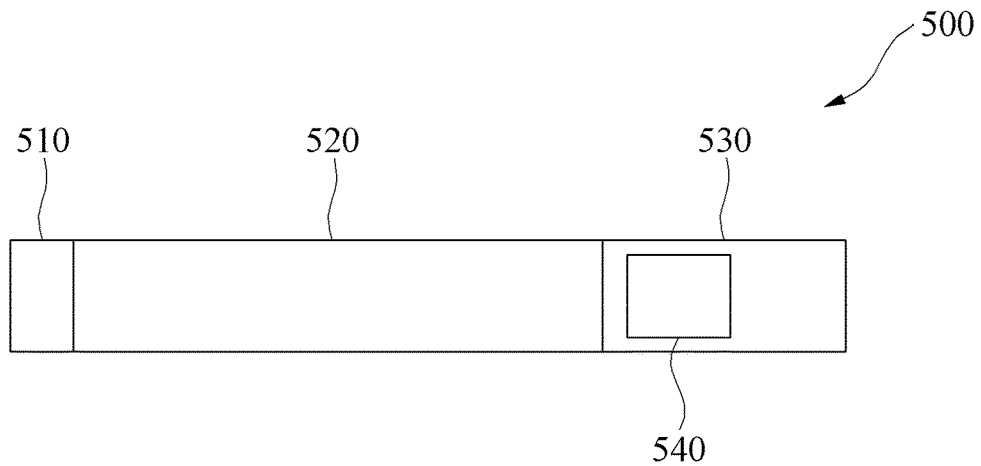
FIG. 5A illustrates an electronic device including a distance detection sensor according to an embodiment.

FIG. 5A illustrates an electronic device including a distance detection sensor according to an embodiment.

The description provided with reference to FIGS. 1 to 4 may also apply to the description provided with reference to FIG. 5A, and any repeated description related thereto will be omitted.

Referring to FIG. 5A, an electronic device 500 according to an embodiment may include a first end portion 510, a middle portion 520, a second end portion 530, and a sensor unit 540. The first end portion 510, the middle portion 520, and the second end portion 530 may have the same functions as the first end portion 410, the middle portion 420, and the second end portion 430 of FIG. 4, respectively.

The sensor unit 540 according to an embodiment may include a distance detection sensor according to an embodiment. The distance detection sensor may be positioned inside or outside the second end portion 530. The distance detection sensor according to an embodiment may be an infrared sensor, a lidar sensor, or an ultrasonic sensor. However, the distance detection sensor of the present disclosure is not limited to the sensor mentioned above.

Figure 5B:
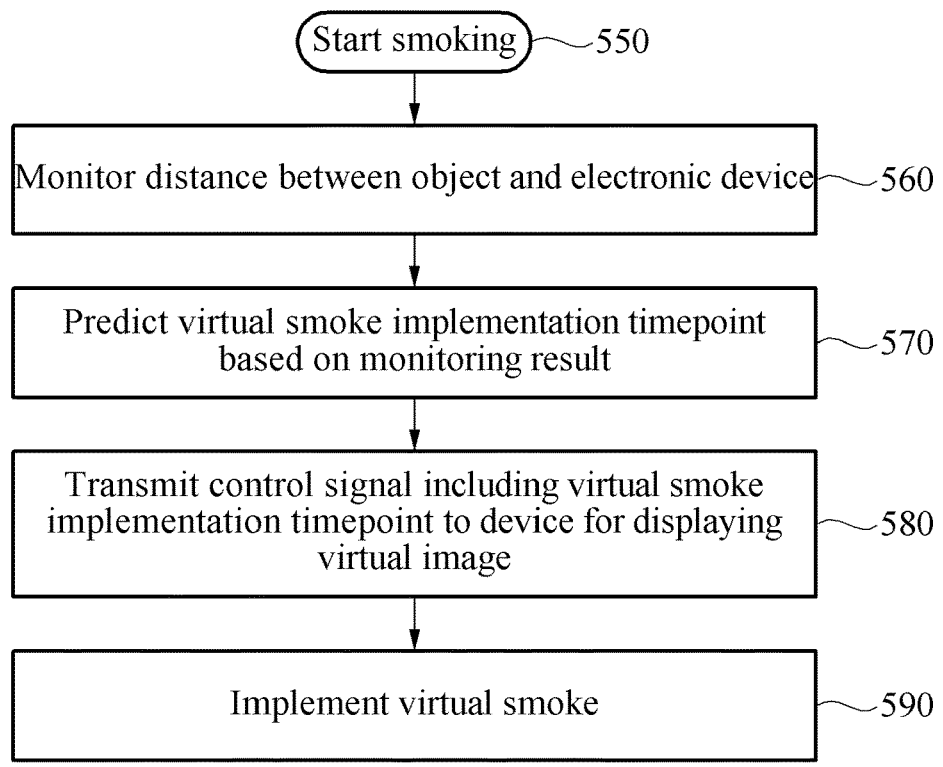
FIG. 5B is a block diagram illustrating a method of predicting a virtual smoke implementation timepoint using a distance detection sensor according to an embodiment.

FIG. 5B is a block diagram illustrating a method of predicting a virtual smoke implementation timepoint using a distance detection sensor according to an embodiment.

Referring to FIG. 5B, according to an embodiment, when a user starts smoking in operation 550, the distance detection sensor may monitor the distance between an object (e.g., the lips of the user) and the electronic device 500 in operation 560. The electronic device 500 may predict a virtual smoke implementation timepoint based on the monitoring result of the distance detection sensor in operation 570. The electronic device 500 may transmit a control signal including the predicted virtual smoke implementation timepoint to the display device 110 (or the XR device 310) in operation 580. The display device 110 may implement virtual smoke based on the above control signal to provide the user with a smoking experience in a virtual space in operation 590. Referring to FIGS. 5A and 5B together, operation 550 of starting smoking according to an embodiment may include an operation of the user bringing the electronic device 500 to the lips and performing an action of inspiration. The user may power on the electronic device 500 to start heating an aerosol generating article therein, and the powered-on electronic device 500 may preheat a heater for heating the aerosol generating article.

Operation 560 of monitoring the distance between the object and the electronic device 500 by the distance detection sensor according to an embodiment may include an operation of detecting a first timepoint at which the object is in contact with the second end portion 530 of the electronic device 500 and an operation of detecting a second timepoint at which the object moves away from the second end portion 530 of the article. For example, the operation of detecting the first timepoint may include detecting the approach of the second end portion 530 of the electronic device 500 to the object within a first threshold distance by the distance detection sensor.

For example, the operation of detecting the second timepoint may include detecting the separation of the object from the second end portion 530 of the electronic device 500 by more than a second threshold distance after the contact by the distance detection sensor.

Operation 570 of predicting the virtual smoke implementation timepoint based on the result of monitoring the distance according to an embodiment may include an operation of predicting the virtual smoke implementation timepoint based on an interval between the first timepoint and the second timepoint. The first timepoint may be a timepoint at which the user starts inhaling smoke. The interval between the first timepoint and the second timepoint may be the time for which the user inhales smoke, and a first respiration time of the user may be predicted based on the smoke inhalation time. The second timepoint may be a timepoint at which the user starts inspiration. A timepoint of second respiration may be predicted based on the interval between the first timepoint and the second timepoint and the first respiration time. The timepoint of second respiration may be the timepoint at which the user starts expiration. For example, the timepoint of second respiration may be determined to be the virtual smoke implementation timepoint.

According to an embodiment, since the smoke inhalation time of the user is the interval between the first timepoint and the second timepoint, the first respiration time, which is the time for which the user performs inspiration, may be estimated to be similar to the smoke inhalation time. Thereafter, the electronic device 500 may predict the timepoint of second respiration, which is the timepoint at which the user starts expiration, to be a timepoint at which the first respiration time elapses from the second timepoint.

For example, if an interval between the first timepoint at which the object is in contact with the second end portion 530 and the second timepoint at which the object moves away from the second end portion 530 is "1" second, the first respiration time may be estimated to be "1" second, and the time for which the user performs inspiration may also be predicted to be "1" second, similar to the first respiration time. Accordingly, the timepoint of second respiration at which the first respiration time elapses from the second timepoint may be predicted to be a timepoint at which "1" second elapses after the object is separated from the electronic device 500. Accordingly, the electronic device 500 may determine the timepoint at which "1" second elapses after the object is separated to be the virtual smoke implementation timepoint.

Operation 570 of predicting the virtual smoke implementation timepoint based on the result of monitoring the distance according to an embodiment may include an operation of estimating an intake volume and a respiration volume of the user based on the interval between the first timepoint and the second timepoint. The intake volume of the user may include an intake volume of an aerosol that is inhaled by the user through the electronic device 500 in a state in which the electronic device 500 and the object are in contact. The respiration volume of the user may include an inspiration volume inhaled by the user in a state in which the electronic device 500 and the object are not in contact. The virtual smoke implementation timepoint may be predicted based on the estimated intake volume and the estimated respiration volume.

Operation 570 of predicting the virtual smoke implementation timepoint based on the monitoring result according to an embodiment may include an operation of determining whether the electronic device 500 satisfies a predetermined operating condition and an operation of predicting the virtual smoke implementation timepoint based on a determination that the electronic device 500 satisfies the operating condition. The predetermined operating condition may include at least one of whether the user powers on/off the electronic device 500 or whether a puff sensor included in the electronic device and a pressure sensor included in the electronic device 500 operate. The value sensed by the distance detection sensor may change due to an object (e.g., a finger) other than a determined object, and the distance detection sensor may be configured to operate only when the user powers on/off the electronic device 500, or the distance detection sensor may be configured to operate in response to sensing inhalation of the user through the puff sensor or the pressure sensor. However, a suction sensor of the present disclosure is not limited to a puff sensor or a pressure sensor.

Operation of transmitting the control signal including the virtual smoke implementation timepoint to the display device 110 according to an embodiment may include an operation of transmitting information about the type of virtual smoke and an operation of transmitting information about a delay in communication between the electronic device 500 and the display device 110. The type of virtual smoke may change according to the selection of the user, or may change according to an aerosol generating article or a fragrance portion embedded in the second end portion 530. In addition, the control signal may include information about the amount of smoking or the respiration volume of the user, and the present disclosure is not limited thereto.

If the virtual smoke implementation timepoint does not coincide with the actual smoking action of the user or it fails to predict an accurate timepoint, an additional task may be performed to proceed with a separate "expiration predict sensing" processing process.

Figure 6A:
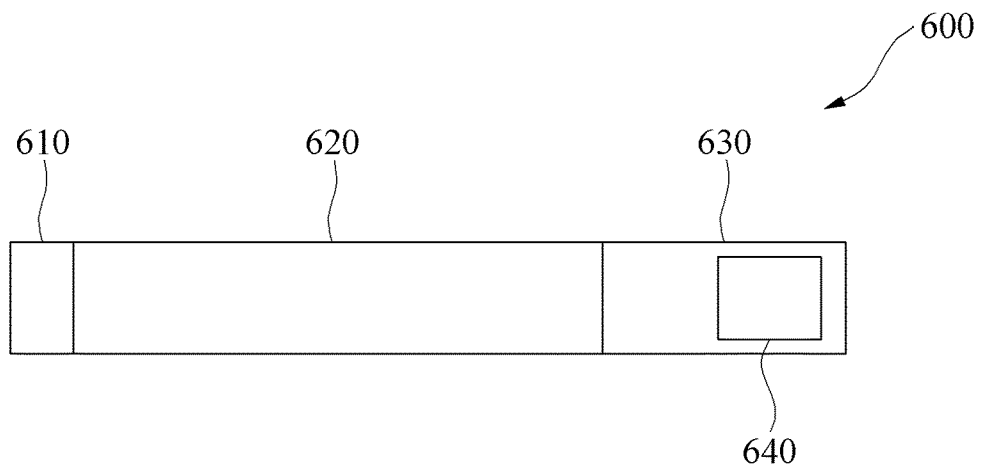
FIG. 6A illustrates an electronic device including a capacitor sensor according to an embodiment.

FIG. 6A illustrates an electronic device including a capacitor sensor according to an embodiment.

The description provided with reference to FIGS. 1 to 4 may also apply to the description provided with reference to FIG. 6A, and any repeated description related thereto will be omitted.

Referring to FIG. 6A, an electronic device 600 according to an embodiment may include a first end portion 610, a middle portion 620, a second end portion 630, and a sensor unit 640. The first end portion 610, the middle portion 620, and the second end portion 630 may have the same functions as the first end portion 410, the middle portion 420, and the second end portion 430 of FIG. 4, respectively.

The sensor unit 640 according to an embodiment may include a capacitor sensor according to an embodiment. The capacitor sensor may be positioned inside or outside the second end portion 630. The capacitor sensor according to an embodiment may be a sensor configured based on a capacitor. However, the capacitor sensor of the present disclosure is not limited to the sensor mentioned above.

Figure 6B:
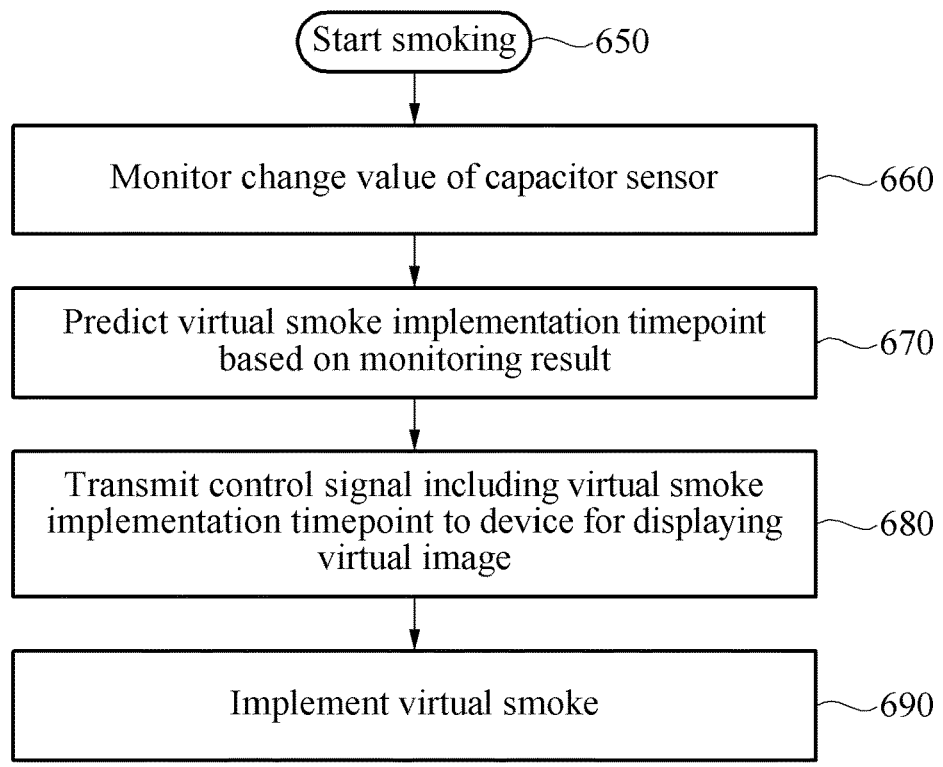
FIG. 6B is a block diagram illustrating a method of predicting a virtual smoke implementation timepoint using a capacitor sensor according to an embodiment.

FIG. 6B is a block diagram illustrating a method of predicting a virtual smoke implementation timepoint using a capacitor sensor according to an embodiment.

Referring to FIG. 6B, according to an embodiment, when a user starts smoking in operation 650, the capacitor sensor may monitor the capacitance of the capacitor sensor that changes when an object (e.g., the lips of a user) is in contact with the electronic device 600 in operation 660. For example, the capacitor sensor may monitor a change value of the capacitance.

According to an embodiment, the electronic device 600 may predict a virtual smoke implementation timepoint based on the monitoring result of the capacitor sensor in operation 670. The electronic device 600 may transmit a control signal including the predicted virtual smoke implementation timepoint to the display device 110 (or the XR device 310) in operation 680. The display device 110 may implement virtual smoke based on the control signal to provide the user with a smoking experience in a virtual space in operation 690.

Referring to FIGS. 6A and 6B together, operation 650 of starting smoking according to an embodiment may include an operation of the user bringing the electronic device 600 to be in contact with the lips and performing an action of inspiration. The user may power on the electronic device 600 to start heating an aerosol generating article therein, and the powered-on electronic device 600 may preheat a heater for heating the aerosol generating article.

Operation 660 of monitoring, by the capacitor sensor according to an embodiment, the capacitance that changes when the object and the electronic device 600 are in contact may include an operation of detecting a first timepoint at which the object is in contact with the second end portion 630 of the electronic device 600 and an operation of detecting a second timepoint at which the object moves away (or is separated) from the second end portion 630 of the article.

For example, the operation of detecting the first timepoint may include detecting the sensed capacitance reaching within a first threshold value by the capacitor sensor when the object is in contact with the second end portion 630 of the electronic device 600.

For example, the operation of detecting the second timepoint may include detecting the sensed capacitance exceeding a second threshold value by the capacitor sensor when the object is separated from the second end portion 630 of the electronic device 600 after the contact.

Operation 670 of predicting the virtual smoke implementation timepoint based on the result of monitoring the capacitance according to an embodiment may include an operation of predicting the virtual smoke implementation timepoint based on an interval between the first timepoint and the second timepoint. The first timepoint may be a timepoint at which the user starts inhaling smoke. The interval between the first timepoint and the second timepoint may be the time for which the user inhales smoke, and a first respiration time of the user may be predicted based on the smoke inhalation time. The second timepoint may be a timepoint at which the user starts inspiration. A timepoint of second respiration may be predicted based on the interval between the first timepoint and the second timepoint and the first respiration time. The timepoint of second respiration may be the timepoint at which the user starts expiration. For example, the timepoint of second respiration may be determined to be the virtual smoke implementation timepoint.

According to an embodiment, since the smoke inhalation time of the user is the interval between the first timepoint and the second timepoint, the first respiration time, which is the time for which the user performs inspiration, may be estimated to be similar to the smoke inhalation time. Thereafter, the electronic device 600 may predict the timepoint of second respiration, which is the timepoint at which the user starts expiration, to be a timepoint at which the first respiration time elapses from the second timepoint.

For example, if an interval between the first timepoint at which the object is in contact with the second end portion 630 and the second timepoint at which the object moves away from the second end portion 630 is "1" second, the first respiration time may be estimated to be "1" second, and the time for which the user performs inspiration may also be predicted to be "1" second, similar to the first respiration time. Accordingly, the timepoint of second respiration at which the first respiration time elapses from the second timepoint may be predicted to be a timepoint at which "1" second elapses after the object is separated from the electronic device 600. Accordingly, the electronic device 600 may determine the timepoint at which "1" second elapses after the object is separated to be the virtual smoke implementation timepoint.

Operation 670 of predicting the virtual smoke implementation timepoint based on the result of monitoring the capacitance according to an embodiment may include an operation of estimating an intake volume and a respiration volume of the user based on the interval between the first timepoint and the second timepoint. The intake volume of the user may include an intake volume of an aerosol that is inhaled by the user through the electronic device 600 in a state in which the electronic device 600 and the object are in contact. The respiration volume of the user may include an inspiration volume inhaled by the user in a state in which the electronic device 600 and the object are not in contact. The virtual smoke implementation timepoint may be predicted based on the estimated intake volume and the estimated respiration volume.

Operation 670 of predicting the virtual smoke implementation timepoint based on the result of monitoring the capacitance according to an embodiment may include an operation of determining whether the electronic device 600 satisfies a predetermined operating condition and an operation of predicting the virtual smoke implementation timepoint based on a determination that the electronic device 600 satisfies the operating condition. The predetermined operating condition may include at least one of whether the user powers on/off the electronic device 600 or whether a puff sensor included in the electronic device and a pressure sensor included in the electronic device 600 operate. The value sensed by the capacitor sensor may change due to an object (e.g., a finger) other than a determined object, and the capacitor sensor may be configured to operate only when the user powers on/off the electronic device 500, or the capacitor sensor may be configured to operate in response to sensing inhalation of the user through the puff sensor or the pressure sensor. However, a suction sensor of the present disclosure is not limited to a puff sensor or a pressure sensor.

Operation of transmitting the control signal including the virtual smoke implementation timepoint to the display device 110 according to an embodiment may include an operation of transmitting information about the type of virtual smoke and an operation of transmitting information about a delay in communication between the electronic device 600 and the display device 110. The type of virtual smoke may change according to the selection of the user, or may change according to an aerosol generating article or a fragrance portion embedded in the second end portion 630. In addition, the control signal may include information about the amount of smoking or the respiration volume of the user, and the present disclosure is not limited thereto.

Figure 7A:
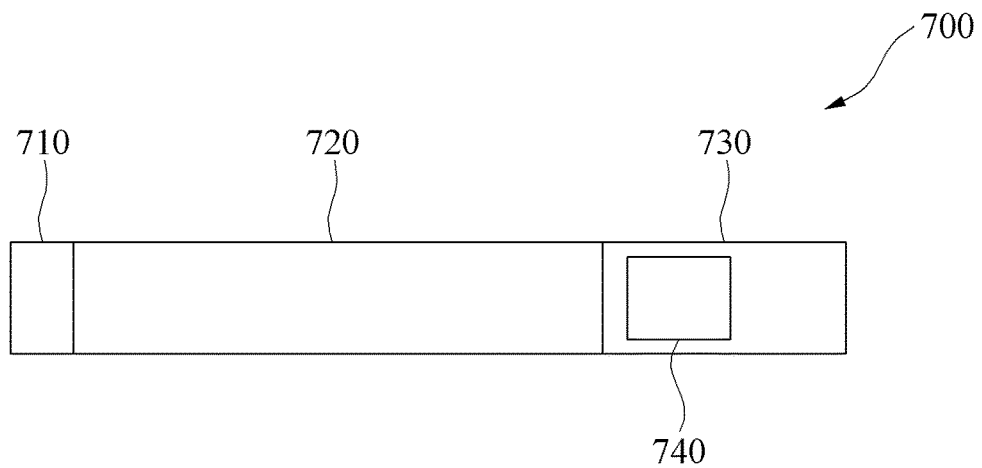
FIG. 7A illustrates an electronic device including a coordinate change sensor according to an embodiment.

FIG. 7A illustrates an electronic device including a coordinate change sensor according to an embodiment.

The description provided with reference to FIGS. 1 to 4 may also apply to the description provided with reference to FIG. 7A, and any repeated description related thereto will be omitted.

Referring to FIG. 7A, an electronic device 700 according to an embodiment may include a first end portion 710, a middle portion 720, a second end portion 730, and a sensor unit 740. The first end portion 710, the middle portion 720, and the second end portion 730 may have the same functions as the first end portion 410, the middle portion 420, and the second end portion 430 of FIG. 4, respectively.

The sensor unit 740 according to an embodiment may include a coordinate change sensor according to an embodiment. The coordinate change sensor may be positioned inside or outside the second end portion 730. The coordinate change sensor according to an embodiment may be a sensor such as a gyro sensor, an acceleration sensor, or a 3-degree of freedom (DOF)/6-DOF sensor. However, the coordinate change sensor of the present disclosure is not limited to the sensor mentioned above.

Figure 7B:
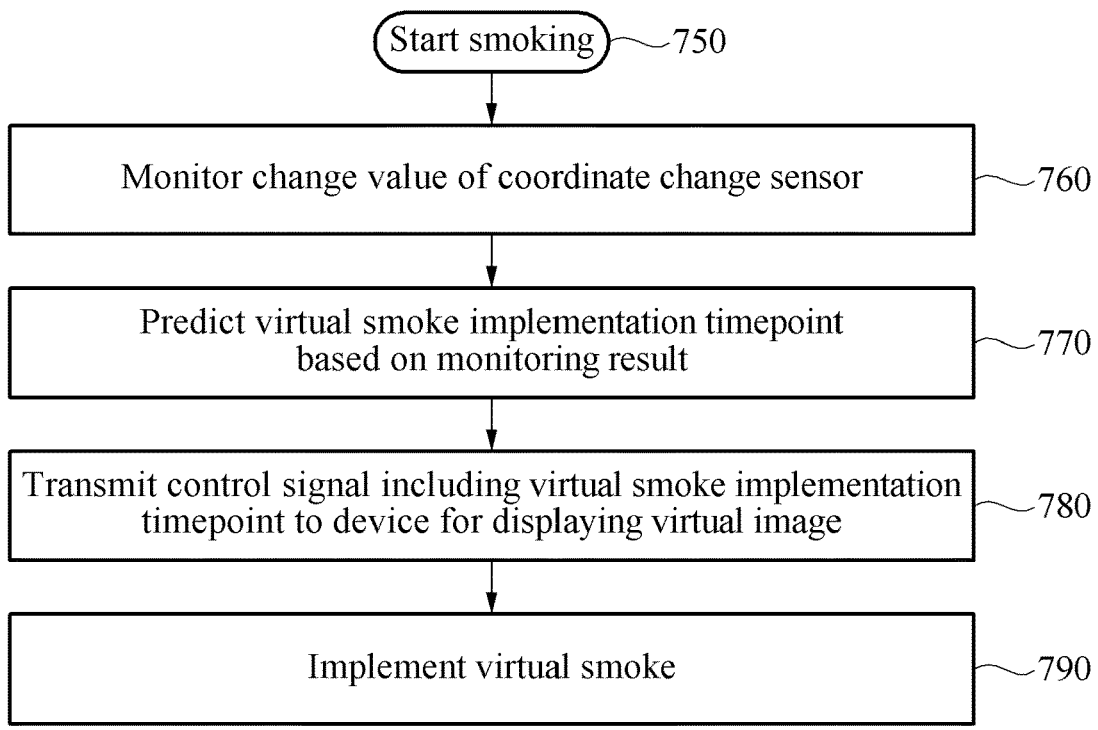
FIG. 7B is a block diagram illustrating a method of predicting a virtual smoke implementation timepoint using a coordinate change sensor according to an embodiment.

FIG. 7B is a block diagram illustrating a method of predicting a virtual smoke implementation timepoint using a coordinate change sensor according to an embodiment. Referring to FIG. 7B, according to an embodiment, when a user starts smoking in operation 750, the coordinate change sensor may monitor a coordinate change between an object (e.g., the lips of the user) and the electronic device 700 in operation 760.

According to an embodiment, the electronic device 700 may predict a virtual smoke implementation timepoint based on the monitoring result of the coordinate change sensor in operation 770. The electronic device 700 may transmit a control signal including the predicted virtual smoke implementation timepoint to the display device 110 (or the XR device 310) in operation 780. The display device 110 may implement virtual smoke based on the above control signal to provide the user with a smoking experience in a virtual space in operation 790.

Referring to FIGS. 7A and 7B together, operation 750 of starting smoking according to an embodiment may include an operation of the user bringing the electronic device 700 to be in contact with the lips and performing an action of inspiration. The user may power on the electronic device 700 to start heating an aerosol generating article therein, and the powered-on electronic device 700 may preheat a heater for heating the aerosol generating article.

Operation 760 of monitoring the coordinate change between the object and the electronic device 700 by the coordinate change sensor according to an embodiment may include an operation of detecting a first timepoint at which the object is in contact with the second end portion 730 of the electronic device 700 and an operation of detecting a second timepoint at which the object moves away from the second end portion 730 of the article.

For example, the operation of detecting the first timepoint may include detecting the approach of the second end portion 730 of the electronic device 700 to the object within first threshold coordinates by the coordinate change sensor and detecting a change in the acceleration while the user brings the electronic device 700 to the object. For example, the operation of detecting the second timepoint may include detecting the separation of the object from the second end portion 730 of the electronic device 700 by more than second threshold coordinates after the contact and detecting a change in the acceleration while the user separates the electronic device 700 from the object.

According to an embodiment, the coordinate change may be measured by comparing the x, y, and z-axis coordinates of the electronic device 700 when the user is lowering his/her hand with the x, y, and z-axis coordinates of the electronic device 700 when the user brings the electronic device 700 to be in contact with the object. When the user moves his or her hand to move the electronic device 700, the measured acceleration may increase and then decrease and stop. The coordinate change may be predicted by measuring an interval in which the acceleration changes, and a smoking time of the user may be estimated based on the predicted coordinate change.

Operation 770 of predicting the virtual smoke implementation timepoint based on the result of monitoring the coordinate change according to an embodiment may include an operation of predicting the virtual smoke implementation timepoint based on an interval between the first timepoint and the second timepoint. The first timepoint may be a timepoint at which the user starts inhaling smoke. The interval between the first timepoint and the second timepoint may be the time for which the user inhales smoke, and a first respiration time of the user may be predicted based on the smoke inhalation time. The second timepoint may be a timepoint at which the user starts inspiration. A timepoint of second respiration may be predicted based on the interval between the first timepoint and the second timepoint and the first respiration time. The timepoint of second respiration may be the timepoint at which the user starts expiration. For example, the timepoint of second respiration may be determined to be the virtual smoke implementation timepoint.

According to an embodiment, since the smoke inhalation time of the user is the interval between the first timepoint and the second timepoint, the first respiration time, which is the time for which the user performs inspiration, may be estimated to be similar to the smoke inhalation time. Thereafter, the electronic device 700 may predict the timepoint of second respiration, which is the timepoint at which the user starts expiration, to be a timepoint at which the first respiration time elapses from the second timepoint.

For example, if an interval between the first timepoint at which the object is in contact with the second end portion 730 and the second timepoint at which the object moves away from the second end portion 730 is "1" second, the first respiration time may be estimated to be "1" second, and the time for which the user performs inspiration may also be predicted to be "1" second, similar to the first respiration time. Accordingly, the timepoint of second respiration at which the first respiration time elapses from the second timepoint may be predicted to be a timepoint at which "1" second elapses after the object is separated from the electronic device 700. Accordingly, the electronic device 700 may determine the timepoint at which "1" second elapses after the object is separated to be the virtual smoke implementation timepoint.

Operation 770 of predicting the virtual smoke implementation timepoint based on the monitoring result according to an embodiment may include an operation of estimating an intake volume and a respiration volume of the user based on the interval between the first timepoint and the second timepoint. The intake volume of the user may include an intake volume of an aerosol that is inhaled by the user through the electronic device 700 in a state in which the electronic device 700 and the object are in contact. The respiration volume of the user may include an inspiration volume inhaled by the user in a state in which the electronic device 700 and the object are not in contact. The virtual smoke implementation timepoint may be predicted based on the estimated intake volume and the estimated respiration volume.

Operation 770 of predicting the virtual smoke implementation timepoint based on the monitoring result according to an embodiment may include an operation of determining whether the electronic device 700 satisfies a predetermined operating condition and an operation of predicting the virtual smoke implementation timepoint based on a determination that the electronic device 700 satisfies the operating condition. The predetermined operating condition may include at least one of whether the user powers on/off the electronic device 700 or whether a puff sensor included in the electronic device and a pressure sensor included in the electronic device 700 operate. The value sensed by the coordinate change sensor may change due to an object (e.g., a finger) other than a determined object, and the coordinate change sensor may be configured to operate only when the user powers on/off the electronic device 500, or the coordinate change sensor may be configured to operate in response to sensing inhalation of the user through the puff sensor or the pressure sensor. However, a suction sensor of the present disclosure is not limited to a puff sensor or a pressure sensor.

Operation of transmitting the control signal including the virtual smoke implementation timepoint to the display device 110 according to an embodiment may include an operation of transmitting information about the type of virtual smoke and an operation of transmitting information about a delay in communication between the electronic device 700 and the display device 110. The type of virtual smoke may change according to the selection of the user, or may change according to an aerosol generating article or a fragrance portion embedded in the second end portion 730. In addition, the control signal may include information about the amount of smoking or the respiration volume of the user, and the present disclosure is not limited thereto.

Figure 8A:
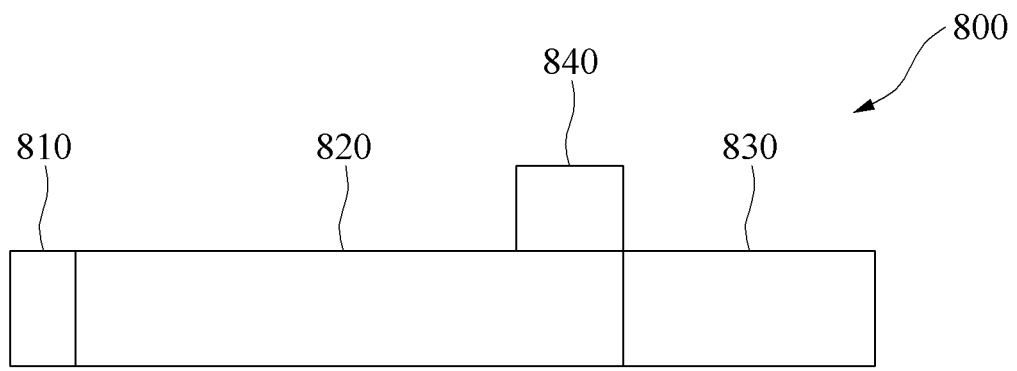
FIG. 8A illustrates an electronic device including a camera according to an embodiment.

FIG. 8A illustrates an electronic device including a camera according to an embodiment.

The description provided with reference to FIGS. 1 to 4 may also apply to the description provided with reference to FIG. 8A, and any repeated description related thereto will be omitted.

Referring to FIG. 8A, an electronic device 800 according to an embodiment may include a first end portion 810, a middle portion 820, a second end portion 830, and a camera unit 840. The first end portion 810, the middle portion 820, and the second end portion 830 may have the same functions as the first end portion 410, the middle portion 420, and the second end portion 430 of FIG. 4, respectively.

The camera unit 840 according to an embodiment may include a camera according to an embodiment. The camera unit 840 may include a camera according to an embodiment. The camera may be positioned on the outer surface of a housing of the electronic device 800.

Figure 8B:
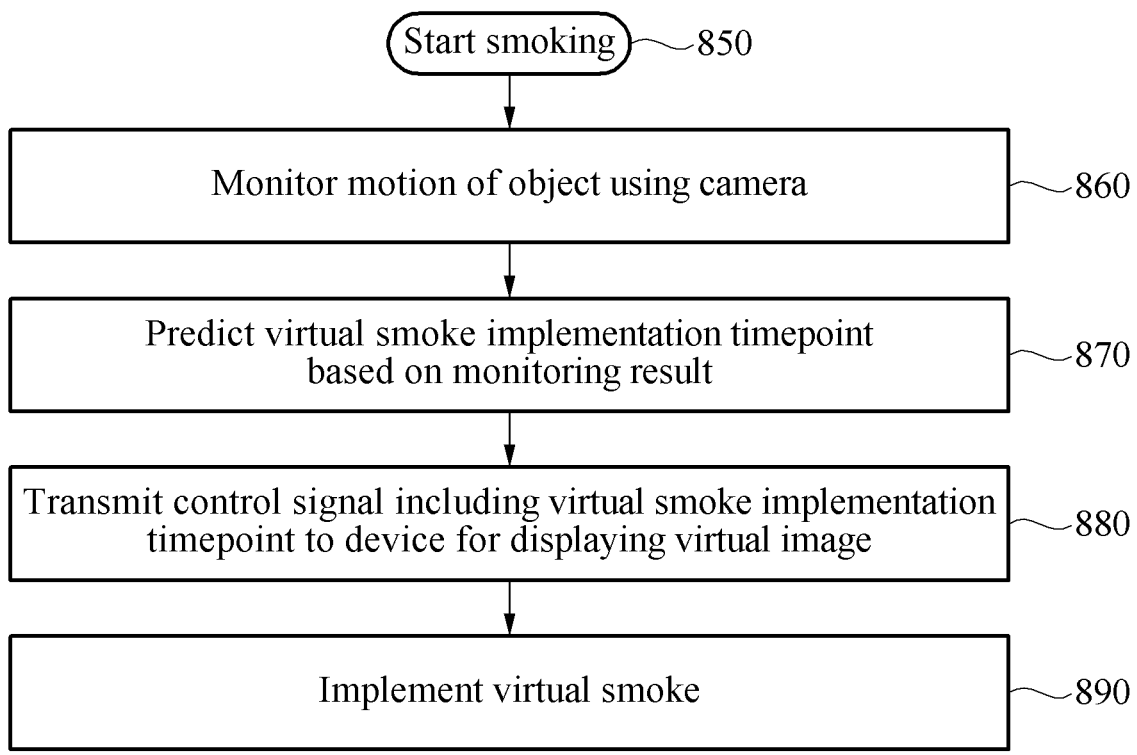
FIG. 8B is a block diagram illustrating a method of predicting a virtual smoke implementation timepoint using a camera according to an embodiment.

FIG. 8B is a block diagram illustrating a method of predicting a virtual smoke implementation timepoint using a camera according to an embodiment.

Referring to FIG. 8B, according to an embodiment, when a user starts smoking in operation 850, the camera may monitor a motion of an object (e.g., the lips of the user) in operation 860. The electronic device 800 may predict a virtual smoke implementation timepoint based on the monitoring result of the camera in operation 870. The electronic device 800 may transmit a control signal including the predicted virtual smoke implementation timepoint to the display device 110 (or the XR device 310) in operation 880. The display device 110 may implement virtual smoke based on the above control signal to provide the user with a smoking experience in a virtual space in operation 890.

Referring to FIGS. 8A and 8B together, operation 850 of starting smoking according to an embodiment may include an operation of the user bringing the electronic device 800 to be in contact with the lips and performing an action of inspiration. The user may power on the electronic device 800 to start heating an aerosol generating article therein, and the powered-on electronic device 800 may preheat a heater for heating the aerosol generating article.

Operation 860 of monitoring the distance between the object and the electronic device 800 by the camera according to an embodiment may include an operation of detecting a first timepoint at which the motion of the object changes so as to be in contact with the second end portion 830 of the electronic device 800 and an operation of detecting a second timepoint at which the motion of the object changes so as to be separated from the second end portion 830 of the electronic device 800.

For example, the operation of detecting the first timepoint may include detecting, by the camera, a first motion of the object to bring the second end portion 830 of the electronic device 800 to be in contact with the lips.

For example, the operation of detecting the second timepoint may include detecting, by the camera, a second motion of the object so as to be separated from the second end portion 830 of the electronic device 800.

Operation 870 of predicting the virtual smoke implementation timepoint based on the monitoring result of the camera according to an embodiment may include an operation of predicting the virtual smoke implementation timepoint based on an interval between the first timepoint and the second timepoint. The first timepoint may be a timepoint at which the user starts inhaling smoke. The interval between the first timepoint and the second timepoint may be the time for which the user inhales smoke, and a first respiration time of the user may be predicted based on the smoke inhalation time. The second timepoint may be a timepoint at which the user starts inspiration. A timepoint of second respiration may be predicted based on the interval between the first timepoint and the second timepoint and the first respiration time. The timepoint of second respiration may be the timepoint at which the user starts expiration. For example, the timepoint of second respiration may be determined to be the virtual smoke implementation timepoint.

According to an embodiment, since the smoke inhalation time of the user is the interval between the first timepoint and the second timepoint, the first respiration time, which is the time for which the user performs inspiration, may be estimated to be similar to the smoke inhalation time. Thereafter, the electronic device 800 may predict the timepoint of second respiration, which is the timepoint at which the user starts expiration, to be a timepoint at which the first respiration time elapses from the second timepoint. For example, if an interval between the first timepoint at which the object is in contact with the second end portion 830 and the second timepoint at which the object moves away from the second end portion 830 is "1" second, the first respiration time may be estimated to be "1" second, and the time for which the user performs inspiration may also be predicted to be "1" second, similar to the first respiration time. Accordingly, the timepoint of second respiration at which the first respiration time elapses from the second timepoint may be predicted to be a timepoint at which "1" second elapses after the object is separated from the electronic device 800. Accordingly, the electronic device 800 may determine the timepoint at which "1" second elapses after the object is separated to be the virtual smoke implementation timepoint.

Operation 870 of predicting the virtual smoke implementation timepoint based on the monitoring result according to an embodiment may include an operation of estimating an intake volume and a respiration volume of the user based on the interval between the first timepoint and the second timepoint. The intake volume of the user may include an intake volume of an aerosol that is inhaled by the user through the electronic device 800 in a state in which the electronic device 800 and the object are in contact. The respiration volume of the user may include an inspiration volume inhaled by the user in a state in which the electronic device 800 and the object are not in contact. The virtual smoke implementation timepoint may be predicted based on the estimated intake volume and the estimated respiration volume.

Operation 870 of predicting the virtual smoke implementation timepoint based on the monitoring result according to an embodiment may include an operation of determining whether the electronic device 800 satisfies a predetermined operating condition and an operation of predicting the virtual smoke implementation timepoint based on a determination that the electronic device 800 satisfies the operating condition. The predetermined operating condition may include at least one of whether the user powers on/off the electronic device 800 or whether a puff sensor included in the electronic device and a pressure sensor included in the electronic device 800 operate. The motion sensed by the camera may change due to an object (e.g., a finger) other than a determined object, and the camera may be configured to operate only when the user powers on/off the electronic device 500, or the camera may be configured to operate in response to sensing inhalation of the user through the puff sensor or the pressure sensor. However, a suction sensor of the present disclosure is not limited to a puff sensor or a pressure sensor.

Operation of transmitting the control signal including the virtual smoke implementation timepoint to the display device 110 according to an embodiment may include an operation of transmitting information about the type of virtual smoke and an operation of transmitting information about a delay in communication between the electronic device 800 and the display device 110. The type of virtual smoke may change according to the selection of the user, or may change according to an aerosol generating article or a fragrance portion embedded in the second end portion 830. In addition, the control signal may include information about the amount of smoking or the respiration volume of the user, and the present disclosure is not limited thereto.

Figure 9A:
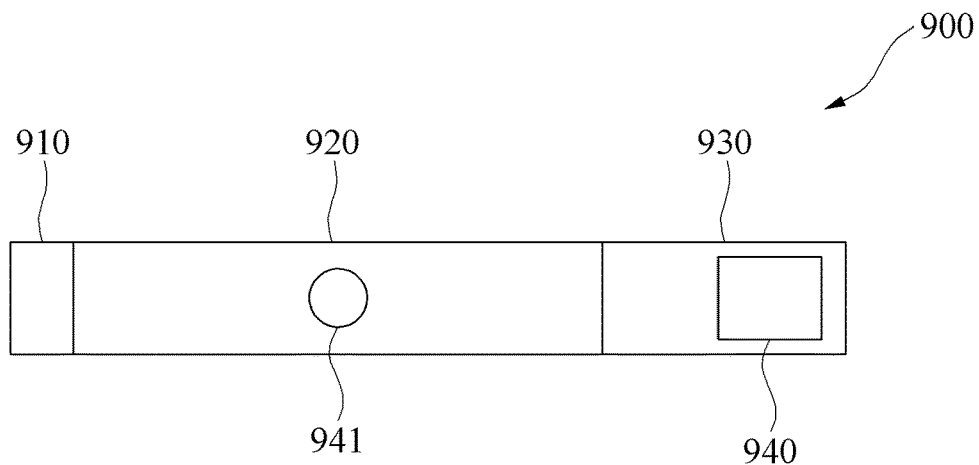
FIG. 9A illustrates an electronic device including a pressure sensor and a button according to an embodiment.

FIG. 9A illustrates an electronic device including a pressure sensor and a button according to an embodiment.

The description provided with reference to FIGS. 1 to 4 may also apply to the description of FIG. 9A, and any repeated description related thereto will be omitted.

Referring to FIG. 9A, an electronic device 900 according to an embodiment may include a first end portion 910, a middle portion 920, a second end portion 930, a sensor unit 940, and a button 941. The first end portion 910, the middle portion 920, and the second end portion 930 may have the same functions as the first end portion 410, the middle portion 420, and the second end portion 430 of FIG. 4, respectively.

The sensor unit 940 according to an embodiment may include a pressure sensor according to an embodiment. The pressure sensor may be positioned inside or outside the second end portion 930. The pressure sensor may sense whether a user inhales by measuring the pressure generated when the user brings the second end portion to the lips or bites the second end portion for smoking.

According to an embodiment, the button 941 may have a function for powering on/off the electronic device 900 and may include an input function for storing a smoking pattern of the user. The button 941 may include a function for determining whether it is an operation of a power function or an operation for storing a smoking pattern according to an input of the user. For example, the button 941 may have a function for powering on/off in response to a long press or may have a function for storing a smoking pattern or a function for operating to transmit a control signal to change the type of smoke in response to a short press. However, the button 941 of the present disclosure is not limited to the above functions.

Figure 9B:
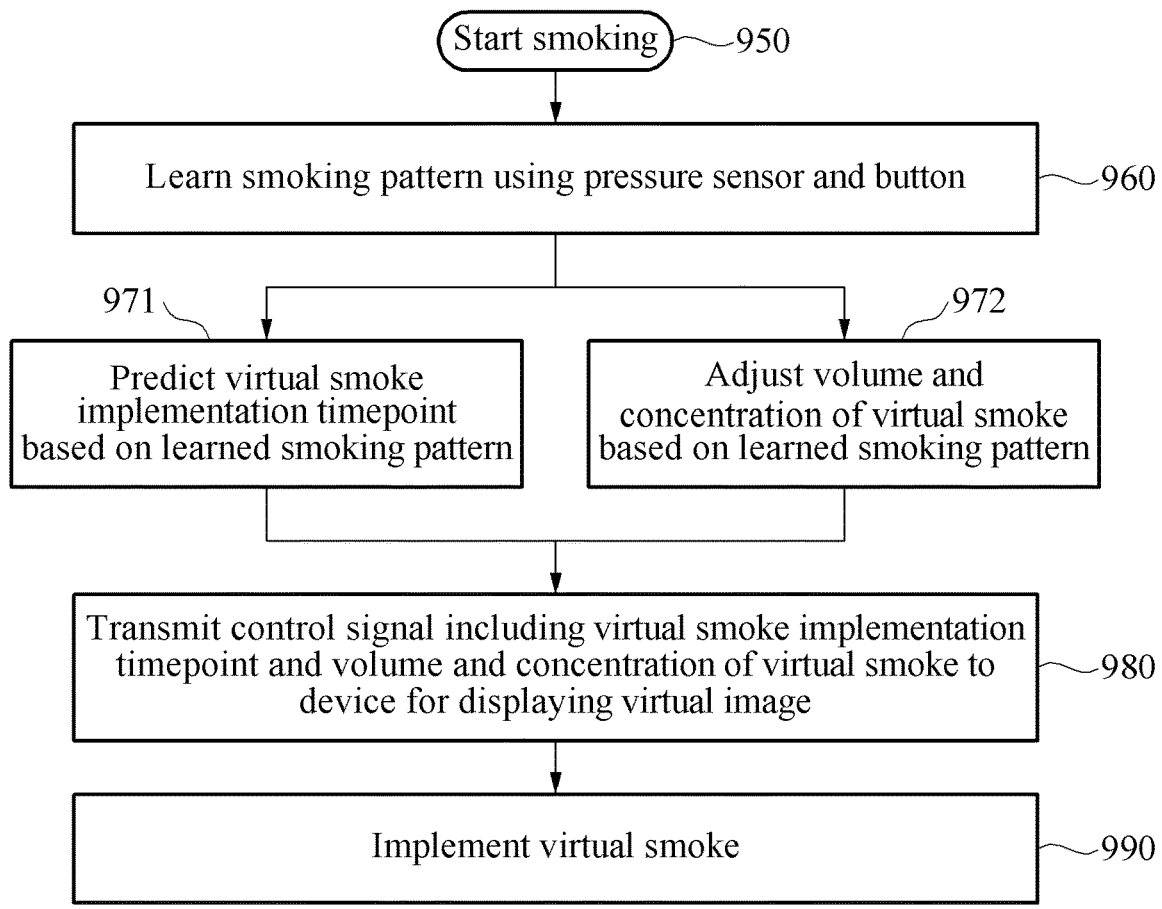
FIG. 9B is a block diagram illustrating a method of predicting a virtual smoke implementation timepoint using a pressure sensor according to an embodiment.

FIG. 9B is a block diagram illustrating a method of predicting a virtual smoke implementation timepoint using a pressure sensor according to an embodiment.

Referring to FIG. 9B, according to an embodiment, when a user starts smoking in operation 950, the electronic device 900 may learn a smoking pattern using the pressure sensor and the button 941. Based on the learned smoking pattern, a virtual smoke implementation timepoint may be predicted in operation 971, and the volume and concentration of virtual smoke may be adjusted in operation 972. The electronic device 900 may transmit a control signal including the predicted virtual smoke implementation timepoint and the volume and concentration of virtual smoke to the display device 110 (or the XR device 310) in operation 980. The display device 110 may implement virtual smoke based on the above control signal to provide the user with a smoking experience in a virtual space in operation 990.

Referring to FIGS. 9A and 9B together, operation 950 of starting smoking according to an embodiment may include an operation of the user bringing the electronic device 900 to the lips and performing an action of inspiration. The user may power on the electronic device 900 to start heating an aerosol generating article therein, and the powered-on electronic device 900 may preheat a heater for heating the aerosol generating article.

Operation 960 of learning the smoking pattern using the pressure sensor and the button 941 according to an embodiment may include an operation of detecting a first timepoint at which the pressure value sensed by the pressure sensor is measured exceeding a first threshold value as the object is in contact with the second end portion 930 of the electronic device 900, an operation of detecting a second timepoint at which the pressure value sensed by the pressure sensor is measured within a second threshold value as the object is separated from the second end portion 930 after the first timepoint, and an operation of detecting a third timepoint at which the button of the electronic device 900 operates after the second timepoint.

In a method of learning a smoking pattern according to an embodiment, when a user starts puffing to smoke, a timepoint at which the pressure changes may be measured and stored by the pressure sensor. Thereafter, a timepoint at which the value sensed by the pressure sensor at the timepoint the user ends puffing is restored may be stored. The time duration between the puff start timepoint and the puff end timepoint may be a smoke inhalation time of the user, which may be similar to an inspiration time of the user.

Thereafter, when the user exhales the inhaled smoke, the user may press the button of the electronic device 900 to input the start of expiration. When the expiration of the user ends, the user may terminate the input of the button. The time duration between the expiration start timepoint and the expiration end timepoint may be similar to an expiration time of the user. The electronic device 900 may generate an algorithm for a smoking pattern of the user based on the smoking pattern of the user that has been performed at least one more time as described above, and may store a smoking pattern learned based on the algorithm.

Operation 971 of predicting the virtual smoke implementation timepoint based on the learned smoking pattern according to an embodiment may include an operation of storing a smoking pattern based on an interval between the first timepoint and the second timepoint and between the second timepoint and the third timepoint and an operation of collecting data related to the smoking pattern with respect to at least one or more intervals between the first timepoint and the second timepoint and between the second timepoint and the third timepoint.

Operation 971 of predicting the virtual smoke implementation timepoint based on the learned smoking pattern according to an embodiment may include an operation of predicting the virtual smoke implementation timepoint based on an interval between the first timepoint and the second timepoint. The first timepoint may be a timepoint at which the user starts inhaling smoke. The interval between the first timepoint and the second timepoint may be the time for which the user inhales smoke, and a first respiration time of the user may be predicted based on the smoke inhalation time. The second timepoint may be a timepoint at which the user starts inspiration. A timepoint of second respiration may be predicted based on the interval between the first timepoint and the second timepoint and the first respiration time. The timepoint of second respiration may be the timepoint at which the user starts expiration. For example, the timepoint of second respiration may be determined to be the virtual smoke implementation timepoint.

According to an embodiment, since the smoke inhalation time of the user is the interval between the first timepoint and the second timepoint, the first respiration time, which is the time for which the user performs inspiration, may be estimated to be similar to the smoke inhalation time. Thereafter, the electronic device 900 may predict the timepoint of second respiration, which is the timepoint at which the user starts expiration, to be a timepoint at which the first respiration time elapses from the second timepoint. For example, if an interval between the first timepoint at which the object is in contact with the second end portion 930 and the second timepoint at which the object moves away from the second end portion 930 is "1" second, the first respiration time may be estimated to be "1" second, and the time for which the user performs inspiration may also be predicted to be "1" second, similar to the first respiration time. Accordingly, the timepoint of second respiration at which the first respiration time elapses from the second timepoint may be predicted to be a timepoint at which "1" second elapses after the object is separated from the electronic device 900. Accordingly, the electronic device 900 may determine the timepoint at which "1" second elapses after the object is separated to be the virtual smoke implementation timepoint.

Operation 971 of predicting the virtual smoke implementation timepoint based on the learned smoking pattern according to an embodiment may include an operation of estimating an intake volume and a respiration volume of the user based on the interval between the first timepoint and the second timepoint. The intake volume of the user may include an intake volume of an aerosol that is inhaled by the user through the electronic device 900 in a state in which the electronic device 900 and the object are in contact. The respiration volume of the user may include an inspiration volume inhaled by the user in a state in which the electronic device 900 and the object are not in contact. The virtual smoke implementation timepoint may be predicted based on the estimated intake volume and the estimated respiration volume.

Operation 971 of predicting the virtual smoke implementation timepoint based on the learned smoking pattern according to an embodiment may include an operation of determining whether the electronic device 900 satisfies a predetermined operating condition and an operation of predicting the virtual smoke implementation timepoint based on a determination that the electronic device 900 satisfies the operating condition. The predetermined operating condition may include at least one of whether the user powers on/off the electronic device 900 or whether a puff sensor included in the electronic device and a pressure sensor included in the electronic device 900 operate. The value sensed by the pressure sensor may change due to an object (e.g., a finger) other than a determined object, and the pressure sensor may be configured to operate only when the user powers on/off the electronic device 500, or the pressure sensor may be configured to operate in response to sensing inhalation of the user through the puff sensor or the pressure sensor. However, a suction sensor of the present disclosure is not limited to a puff sensor or a pressure sensor.

Operation 972 of adjusting the volume and concentration of virtual smoke based on the learned smoking pattern according to an embodiment may include an operation of storing data about a comparison between the operation time of the pressure sensor and the operation time of the button 941 and an operation of storing the volume and concentration of virtual smoke determined based on the data about the comparison, in the learned smoking pattern.

According to an embodiment, the volume and concentration of virtual smoke may vary according to the smoking pattern of the user. For example, if the expiration time of the user is shorter than the puff time of the user, the volume of virtual smoke may be increased so that thicker smoke may be output. If the puff time of the user detected by the pressure sensor is "2" seconds and it takes "1.5" seconds for the user to release the button after pressing it, the volume and concentration of virtual smoke may be adjusted so that more and thicker smoke may be emitted. That is, since the puff time of the user is the smoke inhalation time and the button operation time of the user is the expiration time, if the expiration time of the user is shorter than the smoke inhalation time of the user, then it may mean that the user exhaled the same amount of smoke for a short period of time. Thus, the display device 110 should implement a larger amount of smoke at a thicker concentration in a short time.

Operation of transmitting the control signal including the virtual smoke implementation timepoint and the volume and concentration of virtual smoke to the display device 110 according to an embodiment may include an operation of transmitting information about the type of virtual smoke and an operation of transmitting information about a delay in communication between the electronic device 900 and the display device 110. The type of virtual smoke may change according to the selection of the user, or may change according to an aerosol generating article or a fragrance portion embedded in the second end portion 930. In addition, the control signal may include information about the amount of smoking or the respiration volume of the user, and the present disclosure is not limited thereto.

Figure 10A:
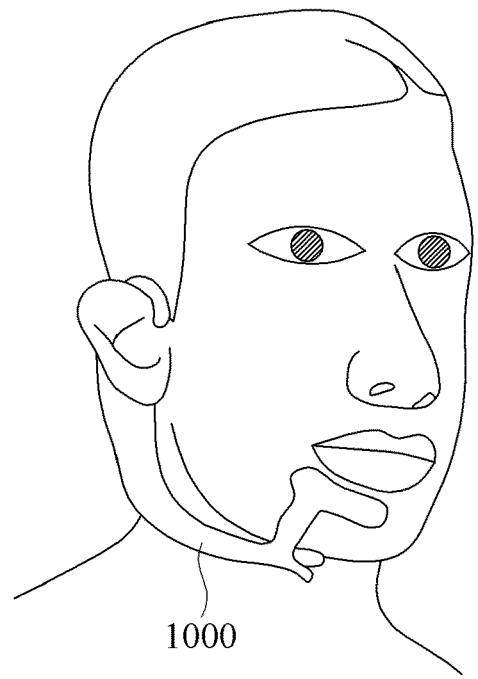
FIG. 10A illustrates a user wearing a surface electromyogram (EMG) sensor module included in an extended reality (XR) device according to an embodiment.

FIG. 10A illustrates a user wearing a surface electromyogram (EMG) sensor module included in an extended reality (XR) device according to an embodiment.

The description provided with reference to FIGS. 1 to 4 may also apply to the description provided with reference to FIG. 10A, and any repeated description related thereto will be omitted.

Referring to FIG. 10A, a surface EMG sensor 1000 may determine a motion that a user is performing by analyzing electrical signals emitted during muscle contraction. For example, surface electromyography (sEMG) measures a synthesized signal of motor unit action potentials generated in muscles around surface electrodes through a method of measuring EMG signals by attaching the surface electrodes to the skin. Using this, when the user smokes after connecting a sensor device for monitoring muscle movement to the XR device 310 (or the display device 110), expiration may be predicted.

Figure 10B:
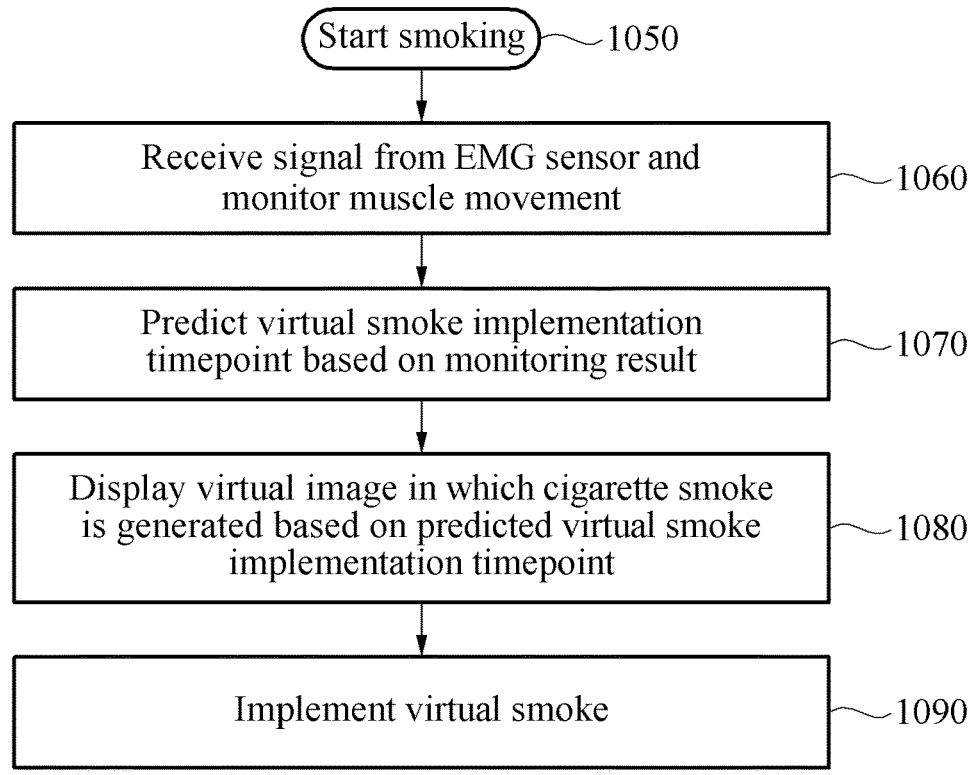
FIG. 10B is a block diagram illustrating a method of predicting a virtual smoke implementation timepoint using a surface EMG sensor according to an embodiment.

FIG. 10B is a block diagram illustrating a method of predicting a virtual smoke implementation timepoint using a surface EMG sensor according to an embodiment.

Referring to FIG. 10B, according to an embodiment, when a user starts smoking in operation 1050, the XR device 310 may receive a signal from the surface EMG sensor and monitor muscle movement in operation 1060. The XR device 310 may predict a virtual smoke implementation timepoint based on the monitoring result of the surface EMG sensor in operation 1070. The XR device 310 may display a virtual image in which cigarette smoke is generated based on the predicted virtual smoke implementation timepoint in operation 1080. The XR device 310 may provide the user with a smoking experience in a virtual space by implementing virtual smoke in operation 1090.

Referring to FIGS. 10A and 10B together, operation 1050 of starting smoking according to an embodiment may include an operation of the user bringing the electronic device 400 to the lips and performing an action of inspiration. The user may power on and preheat the electronic device 400 to start the operation of the electronic device 400.

Operation 1060 of receiving the signal from the surface EMG sensor and monitoring muscle movement by the XR device 310 according to an embodiment may include an operation of detecting a first timepoint at which the object performs a first motion of moving muscle to inhale with the second end portion 430 of the electronic device 400 in the mouth and an operation of detecting a second timepoint at which the object performs a second motion of moving muscle to be separated from the second end portion 430 of the electronic device 400.

For example, the operation of detecting the first timepoint may include detecting the object reaching the first motion by the surface EMG sensor.

For example, the operation of detecting the second timepoint may include detecting the object reaching the second motion by the surface EMG sensor.

Operation 1070 of predicting the virtual smoke implementation timepoint based on the surface EMG monitoring result according to an embodiment may include an operation of predicting the virtual smoke implementation timepoint based on an interval between the first timepoint and the second timepoint. The first timepoint may be a timepoint at which the user starts inhaling smoke. The interval between the first timepoint and the second timepoint may be the time for which the user inhales smoke, and a first respiration time of the user may be predicted based on the smoke inhalation time. The second timepoint may be a timepoint at which the user starts inspiration. A timepoint of second respiration may be predicted based on the interval between the first timepoint and the second timepoint and the first respiration time. The timepoint of second respiration may be the timepoint at which the user starts expiration. For example, the timepoint of second respiration may be determined to be the virtual smoke implementation timepoint.

According to an embodiment, since the smoke inhalation time of the user is the interval between the first timepoint and the second timepoint, the first respiration time, which is the time for which the user performs inspiration, may be estimated to be similar to the smoke inhalation time. Thereafter, the XR device 310 may predict the timepoint of second respiration, which is the timepoint at which the user starts expiration, to be a timepoint at which the first respiration time elapses from the second timepoint.

For example, if an interval between the first timepoint at which the object is in contact with the second end portion 430 and the second timepoint at which the object moves away from the second end portion 430 is "1" second, the first respiration time may be estimated to be "1" second, and the time for which the user performs inspiration may also be predicted to be "1" second, similar to the first respiration time. Accordingly, the timepoint of second respiration at which the first respiration time elapses from the second timepoint may be predicted to be a timepoint at which "1" second elapses after the object is separated from the electronic device 400. Accordingly, the XR device 310 may determine the timepoint at which "1" second elapses after the object is separated to be the virtual smoke implementation timepoint.

Operation 1070 of predicting the virtual smoke implementation timepoint based on the surface EMG monitoring result according to an embodiment may include an operation of estimating an intake volume and a respiration volume of the user based on the interval between the first timepoint and the second timepoint. The intake volume of the user may include an intake volume of an aerosol that is inhaled by the user through the electronic device 400 in a state in which the electronic device 400 and the object are in contact. The respiration volume of the user may include an inspiration volume inhaled by the user in a state in which the electronic device 400 and the object are not in contact. The virtual smoke implementation timepoint may be predicted based on the estimated intake volume and the estimated respiration volume.

Operation 1070 of predicting the virtual smoke implementation timepoint based on the monitoring result according to an embodiment may include an operation of determining whether the electronic device 400 satisfies a predetermined operating condition and an operation of predicting the virtual smoke implementation timepoint based on a determination that the electronic device 400 satisfies the operating condition. The predetermined operating condition may include at least one of whether the user powers on/off the electronic device 400 or whether a puff sensor included in the electronic device and a pressure sensor included in the electronic device 400 operate. The value sensed by the surface EMG sensor may change due to a motion (e.g., speaking or chewing action) of the object other than a determined motion of the object, and the surface EMG sensor may be configured to operate and sense only an electrical signal of muscle movement for a smoking action only when the user powers on/off the electronic device 400, or the surface EMG sensor may be configured to operate in response to sensing inhalation of the user through the puff sensor or the pressure sensor. However, a suction sensor of the present disclosure is not limited to a puff sensor or a pressure sensor.

Operation of transmitting the control signal to the display device 110 according to an embodiment may include an operation of transmitting information about the type of virtual smoke and an operation of transmitting information about a delay in communication between the electronic device 400 and the display device 110. The type of virtual smoke may change according to the selection of the user, or may change according to an aerosol generating article or a fragrance portion embedded in the second end portion 430. In addition, the control signal may include information about the amount of smoking or the respiration volume of the user, and the present disclosure is not limited thereto.

Figure 11A:
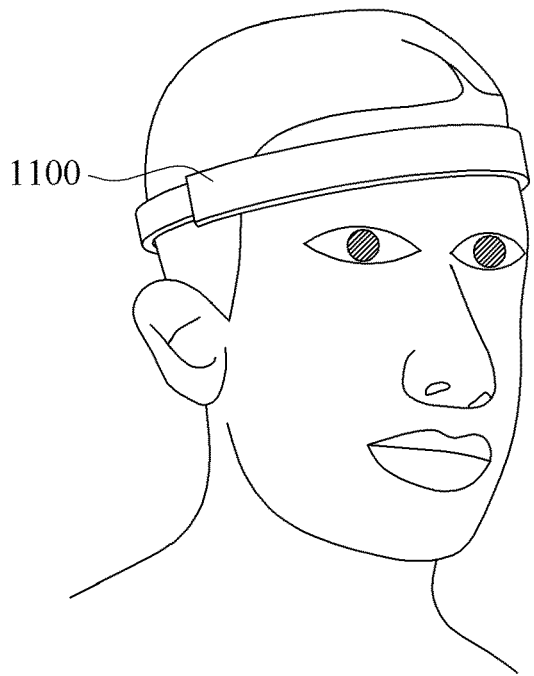
FIG. 11A illustrates a user wearing a brainwave measurement module included in an XR device according to an embodiment.

FIG. 11A illustrates a user wearing a brainwave measurement module included in an XR device according to an embodiment.

The description provided with reference to FIGS. 1 to 4 may also apply to the description provided with reference to FIG. 11A, and any repeated description related thereto will be omitted.

Referring to FIG. 11A, a brainwave measurement module 1100 according to an embodiment may be a device for measuring a brainwave signal (EEG signal), and may include electrodes for detecting a brainwave signal, an amplifier for amplifying a weak brainwave signal, and an analog-to-digital (AD) converter for converting the measured analog brainwave to a digital signal. When a user smokes after attaching this brainwave measurement device module to an XR device, the brainwave of the smoker may be measured and analyzed to predict expiration. That is, the inspiration volume and the expiration timepoint may be predicted by measuring the brainwave with respect to smoke inhalation and measuring the brainwave with respect to an action of inhaling smoke into the lungs through inspiration.

Figure 11B:
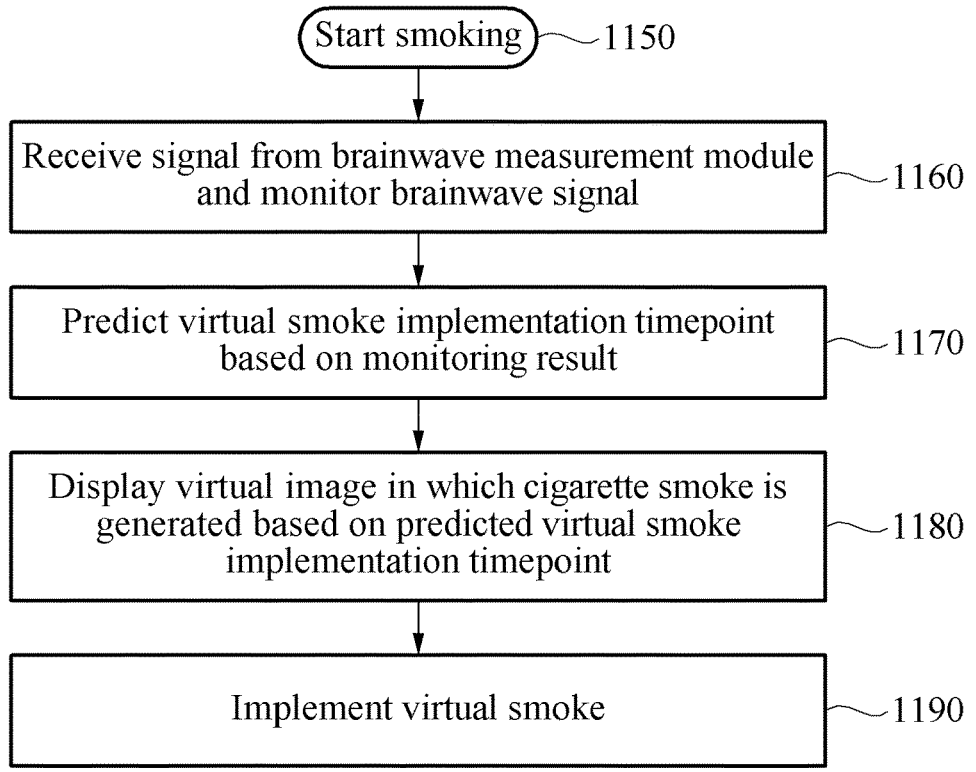
FIG. 11B is a block diagram illustrating a method of predicting a virtual smoke implementation timepoint using a brainwave measurement module according to an embodiment.

FIG. 11B is a block diagram illustrating a method of predicting a virtual smoke implementation timepoint using a brainwave measurement module according to an embodiment.

Referring to FIG. 11B, according to an embodiment, when a user starts smoking in operation 1150, the XR device 310 may receive a brainwave signal related to a motion of an object through the brainwave measurement module and monitor the brainwave signal in operation 1160. The XR device 310 may predict a virtual smoke implementation timepoint based on the monitoring result of the brainwave measurement module in operation 1170. The XR device 310 may display a virtual image in which cigarette smoke is generated based on the predicted virtual smoke implementation timepoint in operation 1180. The XR device 310 may provide the user with a smoking experience in a virtual space by implementing virtual smoke in operation 1190.

Referring to FIGS. 11A and 11B together, operation 1150 of starting smoking according to an embodiment may include an operation of the user bringing the electronic device 400 to the lips and performing an action of inspiration. The user may power on the electronic device 400 to start heating an aerosol generating article therein, and the powered-on electronic device 400 may preheat a heater for heating the aerosol generating article.

Operation 1160 of receiving the signal from the brainwave measurement module and monitoring the brainwave signal by the XR device 310 according to an embodiment may include an operation of detecting a first timepoint at which a first signal which is a brainwave signal for performing a motion of the user is performed to inhale with the second end portion 430 of the electronic device 400 in the mouth and an operation of detecting a second timepoint at which a second signal which is a brainwave signal for performing a motion of the user is performed to separate the object from the second end portion 430 of the electronic device 400.

For example, the operation of detecting the first timepoint may include detecting the brainwave signal reaching the first signal by the brainwave measurement module.

For example, the operation of detecting the second timepoint may include detecting the brainwave signal reaching the second signal by the brainwave measurement module.

Operation 1170 of predicting the virtual smoke implementation timepoint based on the brainwave signal monitoring result according to an embodiment may include an operation of predicting the virtual smoke implementation timepoint based on an interval between the first timepoint and the second timepoint. The first timepoint may be a timepoint at which the user starts inhaling smoke. The interval between the first timepoint and the second timepoint may be the time for which the user inhales smoke, and a first respiration time of the user may be predicted based on the smoke inhalation time. The second timepoint may be a timepoint at which the user starts inspiration. A timepoint of second respiration may be predicted based on the interval between the first timepoint and the second timepoint and the first respiration time. The timepoint of second respiration may be the timepoint at which the user starts expiration. For example, the timepoint of second respiration may be determined to be the virtual smoke implementation timepoint.

According to an embodiment, since the smoke inhalation time of the user is the interval between the first timepoint and the second timepoint, the first respiration time, which is the time for which the user performs inspiration, may be estimated to be similar to the smoke inhalation time. Thereafter, the XR device 310 may predict the timepoint of second respiration, which is the timepoint at which the user starts expiration, to be a timepoint at which the first respiration time elapses from the second timepoint.

For example, if an interval between the first timepoint at which the object is in contact with the second end portion 430 and the second timepoint at which the object moves away from the second end portion 430 is "1" second, the first respiration time may be estimated to be "1" second, and the time for which the user performs inspiration may also be predicted to be "1" second, similar to the first respiration time. Accordingly, the timepoint of second respiration at which the first respiration time elapses from the second timepoint may be predicted to be a timepoint at which "1" second elapses after the object is separated from the electronic device 400. Accordingly, the XR device 310 may determine the timepoint at which "1" second elapses after the object is separated to be the virtual smoke implementation timepoint.

Operation 1170 of predicting the virtual smoke implementation timepoint based on the brainwave signal monitoring result according to an embodiment may include an operation of estimating an intake volume and a respiration volume of the user based on the interval between the first timepoint and the second timepoint. The intake volume of the user may include an intake volume of an aerosol that is inhaled by the user through the electronic device 400 in a state in which the electronic device 400 and the object are in contact. The respiration volume of the user may include an inspiration volume inhaled by the user in a state in which the electronic device 400 and the object are not in contact. The virtual smoke implementation timepoint may be predicted based on the estimated intake volume and the estimated respiration volume.

Operation 1170 of predicting the virtual smoke implementation timepoint based on the monitoring result according to an embodiment may include an operation of determining whether the electronic device 400 satisfies a predetermined operating condition and an operation of predicting the virtual smoke implementation timepoint based on a determination that the electronic device 400 satisfies the operating condition. The predetermined operating condition may include at least one of whether the user powers on/off the electronic device 400 or whether a puff sensor included in the electronic device and a pressure sensor included in the electronic device 400 operate. The value sensed by the brainwave measurement module may change due to an object (e.g., speaking or chewing action) other than a determined object, and the brainwave measurement module may be configured to operate only when the user powers on/off the electronic device 500, or the brainwave measurement module may be configured to operate in response to sensing inhalation of the user through the puff sensor or the pressure sensor. However, a suction sensor of the present disclosure is not limited to a puff sensor or a pressure sensor.

Operation of transmitting the control signal including the virtual smoke implementation timepoint to the display device 110 according to an embodiment may include an operation of transmitting information about the type of virtual smoke and an operation of transmitting information about a delay in communication between the electronic device 400 and the display device 110. The type of virtual smoke may change according to the selection of the user, or may change according to an aerosol generating article or a fragrance portion embedded in the second end portion 430. In addition, the control signal may include information about the amount of smoking or the respiration volume of the user, and the present disclosure is not limited thereto.

Figure 12A:
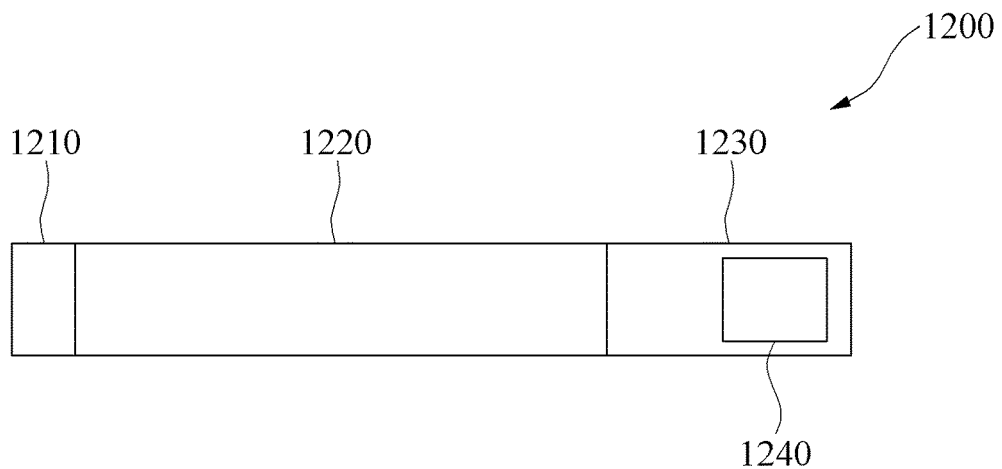
FIG. 12A illustrates an electronic device including a pressure sensor according to an embodiment.

FIG. 12A illustrates an article including a pressure sensor according to an embodiment.

The description provided with reference to FIGS. 1 to 4 may also apply to the description provided with reference to FIG. 12A, and any repeated description related thereto will be omitted.

Referring to FIG. 12A, an electronic device 1200 according to an embodiment may include a first end portion 1210, a middle portion 1220, a second end portion 1230, and a sensor unit 1240. The first end portion 1210, the middle portion 1220, and the second end portion 1230 may have the same functions as the first end portion 410, the middle portion 420, and the second end portion 430 of FIG. 4, respectively.

The sensor unit 1240 according to an embodiment may include a pressure sensor according to an embodiment. The pressure sensor may be positioned inside or outside the second end portion 1230. The pressure sensor according to an embodiment may measure pressure generated by the lips of a user to sense whether or not the user is inhaling.

Figure 12B:
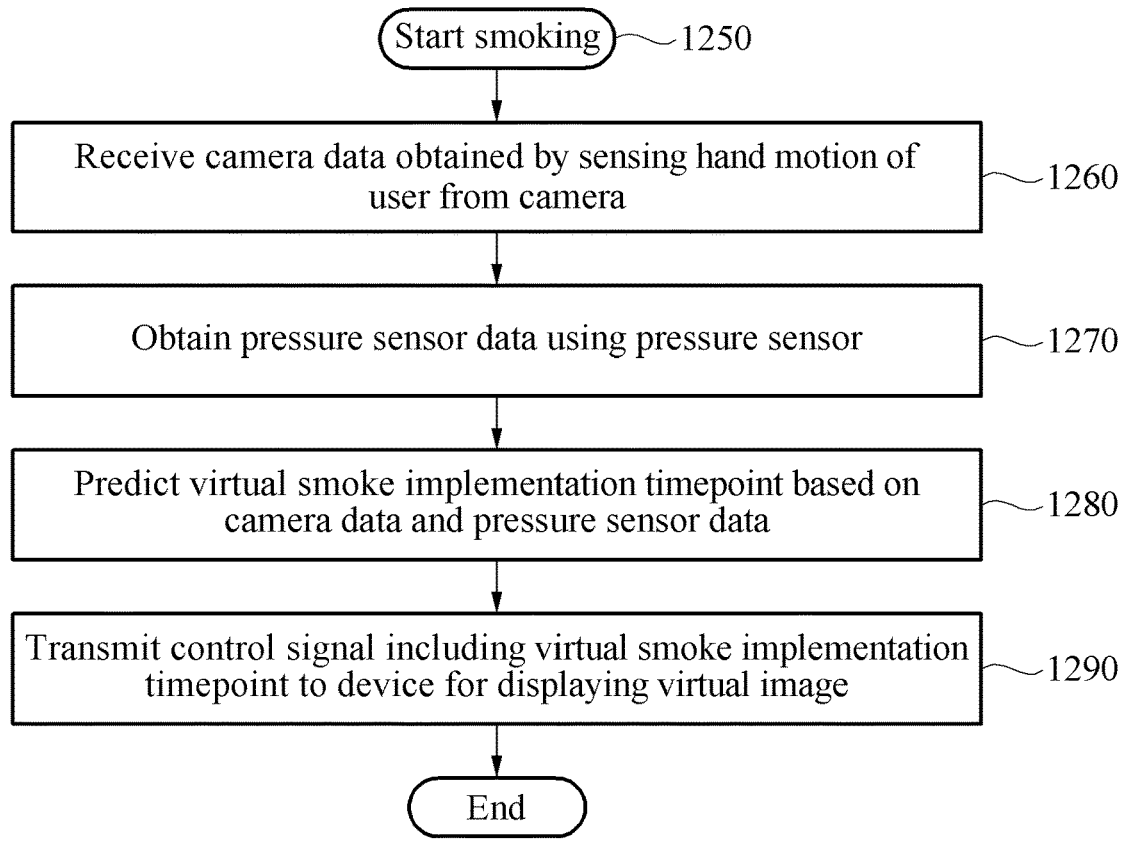
FIG. 12B is a block diagram illustrating a method of predicting a virtual smoke implementation timepoint using a camera and a pressure sensor according to an embodiment.

FIG. 12B is a block diagram illustrating a method of predicting a virtual smoke implementation timepoint using a camera and a pressure sensor according to an embodiment.

Referring to FIGS. 3 and 12B together, according to an embodiment, when a user starts smoking in operation 1250, the XR device 310 may receive camera data obtained by sensing a hand motion of the user from the camera 330 in operation 1260. When the user holds the second end portion 1230 in his or her mouth to smoke, the pressure sensor may obtain pressure sensor data in operation 1270. The electronic device 1200 or the XR device 310 may predict a virtual smoke implementation timepoint based on the received camera data and the pressure sensor data. The electronic device 1200 or the XR device 310 may transmit a control signal including the virtual smoke implementation timepoint to the display device 110 in operation 1290, thereby providing the user with a smoking experience in VR.

Referring to FIGS. 3, 12A, and 12B together, operation 1250 of starting smoking according to an embodiment may include an operation of the user bringing the electronic device 1200 to the lips and performing an action of inspiration. The user may power on the electronic device 1200 to start heating an aerosol generating article therein, and the powered-on electronic device 1200 may preheat a heater for heating the aerosol generating article.

The XR device 310 according to an embodiment may install an application for monitoring the hand motion of the user, and accordingly, may sense smoking motion data of the user through the camera 330 for monitoring the hand motion of the user. The camera 330 may monitor a situation in which the user brings the electronic device 1200 to the mouth and inhales smoke into the lungs through inspiration, separates the electronic device 1200 from the mouth to exhale the smoke, and exhales the smoke. The data received from the camera 330 and the application installed in the XR device 310 may be used to analyze the hand motion of the user as described above to predict the inspiration volume and the expiration timepoint.

According to an embodiment, the XR device 310, the camera 330, and the electronic device 1200 may operate as follows. The XR device 310 in which a smoking device application is installed may be paired with the electronic device 1200 using short-range wireless communication (e.g., Bluetooth). When the user brings the electronic device 1200 to his or her mouth to smoke, the application in the XR device 310 may analyze a hand motion of the user using an image (e.g., camera data) captured by the camera 330. When it is determined through the image captured by the camera 330 that the electronic device 1200 reaches the mouth, and the pressure sensor operates (e.g., the measured pressure value is greater than or equal to a threshold value), it may be determined that the user starts smoking. For example, the electronic device 1200 may transmit the pressure value measured by the pressure sensor to the paired XR device 310. After the user starts smoking, an action of the user of inhaling smoke into the lungs through inspiration, that is, an action of separating the electronic device 1200 from the mouth may be monitored using images captured by the camera 330. By analyzing an interval between the smoking start timepoint and the inhalation start timepoint, an intake volume and an inspiration volume may be estimated, and the timepoint of expiration may be predicted based on the estimated intake volume and inspiration volume.

Operation 1270 of predicting the virtual smoke implementation timepoint based on the monitoring result according to an embodiment may include an operation of predicting the virtual smoke implementation timepoint based on an interval between the first timepoint and the second timepoint. The first timepoint may be a timepoint at which the user starts inhaling smoke. The interval between the first timepoint and the second timepoint may be the time for which the user inhales smoke, and a first respiration time of the user may be predicted based on the smoke inhalation time. The second timepoint may be a timepoint at which the user starts inspiration. A timepoint of second respiration may be predicted based on the interval between the first timepoint and the second timepoint and the first respiration time. The timepoint of second respiration may be the timepoint at which the user starts expiration. For example, the timepoint of second respiration may be determined to be the virtual smoke implementation timepoint.

According to an embodiment, since the smoke inhalation time of the user is the interval between the first timepoint and the second timepoint, the first respiration time, which is the time for which the user performs inspiration, may be estimated to be similar to the smoke inhalation time. Thereafter, the electronic device 1200 may predict the timepoint of second respiration, which is the timepoint at which the user starts expiration, to be a timepoint at which the first respiration time elapses from the second timepoint.

For example, if an interval between the first timepoint at which the object is in contact with the second end portion 1230 and the second timepoint at which the object moves away from the second end portion 1230 is "1" second, the first respiration time may be estimated to be "1" second, and the time for which the user performs inspiration may also be predicted to be "1" second, similar to the first respiration time. Accordingly, the timepoint of second respiration at which the first respiration time elapses from the second timepoint may be predicted to be a timepoint at which "1" second elapses after the object is separated from the electronic device 1200. Accordingly, the electronic device 1200 may determine the timepoint at which "1" second elapses after the object is separated to be the virtual smoke implementation timepoint.

Operation 1270 of predicting the virtual smoke implementation timepoint based on the monitoring result according to an embodiment may include an operation of estimating an intake volume and a respiration volume of the user based on the interval between the first timepoint and the second timepoint. The intake volume of the user may include an intake volume of an aerosol that is inhaled by the user through the electronic device 1200 in a state in which the electronic device 1200 and the object are in contact. The respiration volume of the user may include an inspiration volume inhaled by the user in a state in which the electronic device 1200 and the object are not in contact. The virtual smoke implementation timepoint may be predicted based on the estimated intake volume and the estimated respiration volume.

Operation 1270 of predicting the virtual smoke implementation timepoint based on the monitoring result according to an embodiment may include an operation of determining whether the electronic device 1200 satisfies a predetermined operating condition and an operation of predicting the virtual smoke implementation timepoint based on a determination that the electronic device 1200 satisfies the operating condition. The predetermined operating condition may include at least one of whether the user powers on/off the electronic device 1200 or whether a puff sensor included in the electronic device and a pressure sensor included in the electronic device 1200 operate. The value sensed by the pressure sensor may change due to a motion (e.g., a hand motion other than smoking) of the object other than a determined motion of the object, and the pressure sensor may be configured to operate only when the user powers on/off the electronic device 500, or the pressure sensor may be configured to operate in response to sensing inhalation of the user through the puff sensor or the pressure sensor. However, a suction sensor of the present disclosure is not limited to a puff sensor or a pressure sensor.

Operation of transmitting the control signal including the virtual smoke implementation timepoint to the display device 110 according to an embodiment may include an operation of transmitting information about the type of virtual smoke and an operation of transmitting information about a delay in communication between the electronic device 1200 and the display device 110. The type of virtual smoke may change according to the selection of the user, or may change according to an aerosol generating article or a fragrance portion embedded in the second end portion 1230. In addition, the control signal may include information about the amount of smoking or the respiration volume of the user, and the present disclosure is not limited thereto.

If the virtual smoke implementation timepoint does not coincide with the actual smoking action of the user or it fails to predict an accurate timepoint, an additional task may be performed to proceed with a separate "expiration predict sensing" processing process.

The units described herein may be implemented using a hardware component, a software component and/or a combination thereof. A processing device may be implemented using one or more general-purpose or special-purpose computers, such as, for example, a processor, a controller and an arithmetic logic unit (ALU), a digital signal processor (DSP), a microcomputer, a field-programmable gate array (FPGA), a programmable logic unit (PLU), a microprocessor or any other device capable of responding to and executing instructions in a defined manner. The processing device may run an operating system (OS) and one or more software applications that run on the OS. The processing device also may access, store, manipulate, process, and create data in response to execution of the software. For purpose of simplicity, the description of a processing device is used as singular: however, one skilled in the art will appreciate that a processing device may include multiple processing elements and multiple types of processing elements. For example, the processing device may include a plurality of processors, or a single processor and a single controller. In addition, different processing configurations are possible, such as parallel processors.

The software may include a computer program, a piece of code, an instruction, or some combination thereof, to independently or uniformly instruct or configure the processing device to operate as desired. Software and data may be embodied permanently or temporarily in any type of machine, component, physical or virtual equipment, computer storage medium or device, or in a propagated signal wave capable of providing instructions or data to or being interpreted by the processing device. The software also may be distributed over network-coupled computer systems so that the software is stored and executed in a distributed fashion. The software and data may be stored by one or more non-transitory computer-readable recording mediums.

The methods according to the above-described embodiments may be recorded in non-transitory computer-readable media including program instructions to implement various operations of the above-described embodiments. The media may also include, alone or in combination with the program instructions, data files, data structures, and the like. The program instructions recorded on the media may be those specially designed and constructed for the purposes of embodiments, or they may be of the kind well-known and available to those having skill in the computer software arts. Examples of non-transitory computer-readable media include magnetic media such as hard disks, floppy disks, and magnetic tape: optical media such as CD-ROM discs, DVDs, and/or Blue-ray discs: magneto-optical media such as optical discs: and hardware devices that are specially configured to store and perform program instructions, such as read-only memory (ROM), random access memory (RAM), flash memory (e.g., USB flash drives, memory cards, memory sticks, etc.), and the like. Examples of program instructions include both machine code, such as produced by a compiler, and files containing higher-level code that may be executed by the computer using an interpreter.

The above-described devices may be configured to act as one or more software modules in order to perform the operations of the above-described embodiments, or vice versa.

A number of embodiments have been described above. Nevertheless, it should be understood that various modifications may be made to these embodiments. For example, suitable results may be achieved if the described techniques are performed in a different order and/or if components in a described system, architecture, device, or circuit are combined in a different manner and/or replaced or supplemented by other components or their equivalents.

Accordingly, other implementations are within the scope of the following claims.

The invention claimed is:

1. A method of controlling an electronic device, the method comprising:
    predicting a virtual smoke implementation timepoint by monitoring a distance between one side of the electronic device and an object; and
    transmitting a control signal comprising the virtual smoke implementation timepoint to a device for displaying a virtual image,
    wherein the predicting of the virtual smoke implementation timepoint comprises:
    detecting a first timepoint at which the distance between the one side of the electronic device and the object is less than a first threshold value;
    detecting a second timepoint at which the distance between the one side of the electronic device and the object exceeds a second threshold value, after the first timepoint;
    predicting a first respiration time based on an interval between the first timepoint and the second timepoint; and
    estimating a timepoint of second respiration based on the first respiration time.

2. The method of claim 1, wherein
    the predicting of the virtual smoke implementation timepoint comprises predicting the virtual smoke implementation timepoint based on the interval between the first timepoint and the second timepoint.

3. The method of claim 1, wherein the estimating the timepoint of the second respiration comprises:
    predicting the timepoint of second respiration based on the interval between the first timepoint and the second timepoint and the first respiration time; and
    determining the timepoint of second respiration to be the virtual smoke implementation timepoint.

4. The method of claim 1, wherein
    the predicting of the virtual smoke implementation timepoint comprises estimating an intake volume and a respiration volume of a user based on the interval between the first timepoint and the second timepoint,
    wherein the intake volume comprises an intake volume of an aerosol that is inhaled by the user through the electronic device in a state in which the electronic device and the object are in contact, and
    the respiration volume comprises an inspiration volume inhaled by the user in a state in which the electronic device and the object are not in contact.

5. The method of claim 4, wherein
    the predicting of the virtual smoke implementation timepoint comprises predicting the virtual smoke implementation timepoint based on the intake volume and the respiration volume.

6. The method of claim 1, wherein
    the predicting of the virtual smoke implementation timepoint comprises:
    determining whether the electronic device satisfies a predetermined operating condition; and
    predicting the virtual smoke implementation timepoint based on a determination that the electronic device satisfies the operating condition.

7. The method of claim 6, wherein
    the operating condition comprises at least one of whether the electronic device is powered on/off and whether a suction sensor included in the electronic device operates.

8. The method of claim 1, wherein
    the transmitting of the control signal to the device for displaying a virtual image comprises:
    transmitting information about a type of virtual smoke; and
    transmitting information about a delay in communication between the electronic device and the device for displaying a virtual image.

9. A computer program stored in a computer-readable storage medium to execute the method of claim 1 in combination with hardware.

10. An electronic device comprising:
    a distance detection sensor configured to monitor a distance between one side of the electronic device and an object; and
    a processor configured to predict a virtual smoke implementation timepoint based on a result of the monitoring and transmit a control signal comprising the virtual smoke implementation timepoint to a device for displaying a virtual image,
    wherein the processor is further configured to:
    transmit information about a type of virtual smoke, and
    transmit information about a delay in communication between the electronic device and the device for displaying a virtual image.

* * * * *